(12) United States Patent
Hunzinger et al.

(10) Patent No.: US 8,756,173 B2
(45) Date of Patent: Jun. 17, 2014

(54) MACHINE LEARNING OF KNOWN OR UNKNOWN MOTION STATES WITH SENSOR FUSION

(75) Inventors: Jason Frank Hunzinger, Escondido, CA (US); Anthony Sarah, San Diego, CA (US); Pawan K. Baheti, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 295 days.

(21) Appl. No.: 13/269,513

(22) Filed: Oct. 7, 2011

(65) Prior Publication Data

US 2012/0265716 A1 Oct. 18, 2012

Related U.S. Application Data

(60) Provisional application No. 61/434,400, filed on Jan. 19, 2011.

(51) Int. Cl.
*G06F 17/20* (2006.01)
*G01D 15/00* (2006.01)
*G06N 99/00* (2010.01)

(52) U.S. Cl.
CPC .................................... *G06N 99/005* (2013.01)
USPC ............................................. 706/12; 702/127

(58) Field of Classification Search
None
See application file for complete search history.

(56) References Cited

U.S. PATENT DOCUMENTS

| | | | |
|---|---|---|---|
| 7,570,943 B2 | 8/2009 | Sorvari et al. | |
| 2007/0036347 A1 | 2/2007 | Teicher | |
| 2009/0303204 A1* | 12/2009 | Nasiri et al. | 345/184 |
| 2009/0305661 A1 | 12/2009 | Ito | |
| 2010/0001949 A1 | 1/2010 | Shkolnikov et al. | |
| 2010/0075639 A1 | 3/2010 | Horvitz et al. | |
| 2010/0217533 A1 | 8/2010 | Nadkarni et al. | |
| 2010/0299757 A1 | 11/2010 | Lee | |
| 2010/0317371 A1 | 12/2010 | Westerinen et al. | |
| 2011/0039522 A1 | 2/2011 | Partridge et al. | |
| 2011/0066383 A1* | 3/2011 | Jangle et al. | 702/19 |
| 2011/0070863 A1 | 3/2011 | Ma et al. | |

FOREIGN PATENT DOCUMENTS

| | | |
|---|---|---|
| GB | 2434504 A | 7/2007 |
| WO | WO2008054135 A1 | 5/2008 |

OTHER PUBLICATIONS

Calderon, et al., "Recognition and Generation of Motion Primitives with Humanoid Robots", 2009 IEEE/ASME International Conference on Advanced Intelligent Mechatronics Suntec Convention and Exhibition Center, Singapore, Jul. 14-17, 2009, pp. 917-922.
Ghasemzadeh, et al., "Collaborative Signal Processing for Action Recognition in Body Sensor Networks: A Distributed Classification Algorithm Using Motion Transcripts," IPSN'10, Apr. 12-16, 2010, Stockholm, Sweden, pp. 244-255.

(Continued)

*Primary Examiner* — Alan Chen
(74) *Attorney, Agent, or Firm* — Kilpatrick Townsend & Stockton LLP

(57) ABSTRACT

Example methods, apparatuses, or articles of manufacture are disclosed herein that may be utilized, in whole or in part, to facilitate or support one or more operations or techniques for machine learning of known or unknown motion states with sensor fusion.

60 Claims, 7 Drawing Sheets

(56) References Cited

OTHER PUBLICATIONS

Huynh, et al., "Analyzing Features for Activity Recognition," Joint sOc-EUSAI conference, Grenoble, Oct. 2005, 6 pages.

Valtonen M. et al., "Proactive and Adaptive Fuzzy Profile Control for Mobile Phones", percom, pp. 1-3, 2009 IEEE International Conference on Pervasive Computing and Communications, 2009.

Yang, et al., "Distributed Recognition of Human Actions Using Wearable Motion Sensor Networks," Journal of Ambient Intelligence and Smart Environments (2009), pp. 1-13.

Yang, et al., "Distributed Segmentation and Classification of Human Actions Using a Wearable Motion Sensor Network," Computer Society Conference on Computer Vision and Pattern Recognition Workshops, 2008. CVPRW '08, pp. 1-8.

\* cited by examiner

MACHINE LEARNING OF KNOWN OR UNKNOWN MOTION STATES WITH SENSOR FUSION

CROSS-REFERENCE TO RELATED APPLICATIONS

This patent application claims priority U.S. Provisional Patent Application 61/434,400, entitled "Learning Situations via Pattern Matching," filed on Jan. 19, 2011, which is hereby incorporated by reference. Additionally, U.S. patent application Ser. No. 13/269,516, filed Oct. 7, 2011, entitled "LEARNING SITUATIONS VIA PATTERN MATCHING" is being filed concurrently, the entire disclosure of which is hereby incorporated by reference.

BACKGROUND

1. Field

The present disclosure relates generally to machine learning and, more particularly, to machine learning of known or unknown motion states with sensor fusion for use in or with mobile communication devices.

2. Information

Mobile communication devices, such as, for example, cellular telephones, portable navigation units, laptop computers, personal digital assistants, or the like are becoming more common every day. These devices may include, for example, a variety of sensors to support a number of host applications. Typically, although not necessarily, sensors are capable of converting physical phenomena into analog or digital signals and may be integrated into (e.g., built-in, etc.) or otherwise supported by (e.g., stand-alone, etc.) a mobile communication device. For example, a mobile communication device may feature one or more accelerometers, gyroscopes, magnetometers, gravitometers, ambient light detectors, proximity sensors, temperature sensors, etc., capable of measuring the direction of gravity, spatial orientation, linear or angular motion, ambient environment, or other force or field experienced by the device. Sensors may be utilized individually, for example, or may be used in combination with other sensors, depending on an application.

A popular and rapidly growing market trend in motion sensing includes, for example, applications that may recognize one or more aspects of a motion of a mobile communication device and use such aspects as a form of input. Thus, accurately or otherwise sufficiently determining or inferring a motion state of a mobile communication device may, for example, improve or enhance performance of host applications, provide more intelligent assistance to a user, or the like. In addition, more effective or efficient motion sensing may reduce power consumption of mobile communication devices having limited power resources (e.g., battery-powered, etc.) and may positively affect operating lifetime of such devices. Accordingly, it may be desirable to develop one or more methods, systems, or apparatuses that may implement more effective or efficient motion sensing for a more satisfying user experience.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
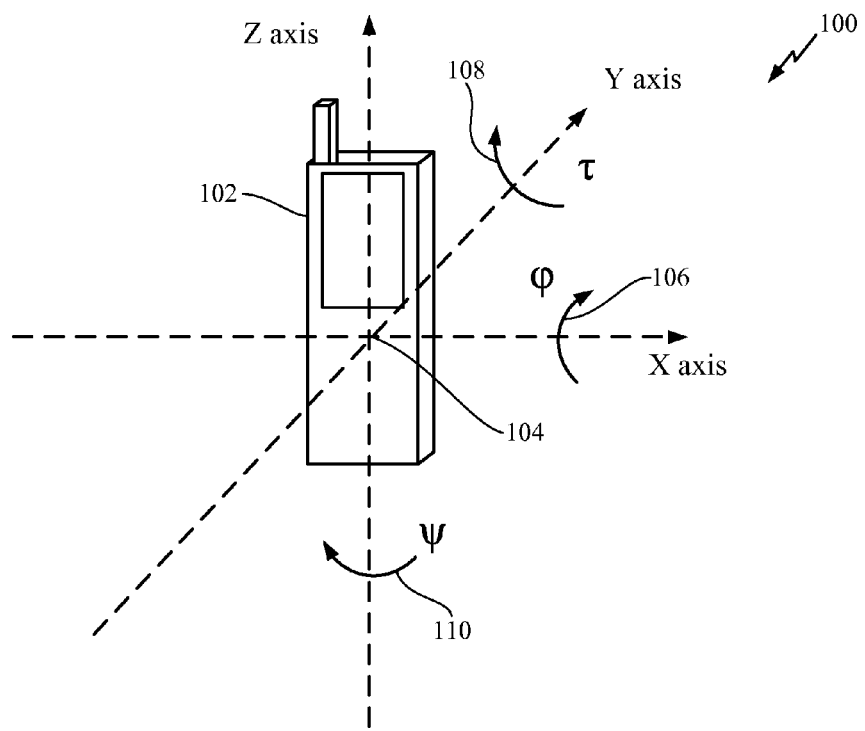
FIG. 1 is an example coordinate system that may be used for machine learning of known or unknown motion states with sensor fusion according to an implementation.

Example implementations relate to machine learning of known or unknown motion states with sensor fusion. In one implementation, a method may comprise extracting, at a mobile device, at least one feature from at least one sensor signal; recognizing at least one primitive based, at least in part, on such at least one extracted feature, such at least one primitive being indicative of a pattern of movement of the mobile device; and identifying a previously unknown motion state based, at least in part, on such at least one recognized primitive.

In another implementation, an apparatus may comprise a mobile device comprising at least one processor to extract at least one feature from at least one sensor signal; recognize at least one primitive based, at least in part, on such at least one extracted feature, such at least one primitive being indicative of a pattern of movement of the mobile device; and identify a previously unknown motion state based, at least in part, on such at least one recognized primitive.

In yet another implementation, an apparatus may comprise means for extracting, at a mobile device, at least one feature from at least one sensor signal; means for recognizing at least one primitive based, at least in part, on such at least one extracted feature, such at least one primitive being indicative of a pattern of movement of the mobile device; and means for identifying a previously unknown motion state based, at least in part, on such at least one recognized primitive.

In yet another implementation, an article may comprise a non-transitory storage medium having instructions stored thereon executable by a special purpose computing platform at a mobile device to extract at least one feature from at least one sensor signal; recognize at least one primitive based, at least in part, on such at least one extracted feature, such at least one primitive being indicative of a pattern of movement of the mobile device; and identify a previously unknown motion state based, at least in part, on such at least one recognized primitive. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for machine learning of known or unknown motion states with sensor fusion for use in or with a mobile communication device. As used herein, "mobile device," "mobile communication device," "wireless device," "hand-held device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information over suitable communications networks according to one or more communication protocols. As a way of illustration, special purpose mobile communication devices, which may herein be called simply mobile devices, may include, for example, cellular telephones, satellite telephones, smart telephones, personal digital assistants (PDAs), laptop computers, personal entertainment systems, tablet personal computers (PC), personal audio or video devices, personal navigation devices, or the like. It should be appreciated, however, that these are merely illustrative examples of mobile devices that may be utilized in connection with machine learning of known or unknown motion states with sensor fusion, and that claimed subject matter is not limited in this regard.

As previously mentioned, a mobile device may comprise a number of sensors that provide measurement signals that may be processed in some manner, such as via a suitable application processor, for example, so as to recognize, infer, or classify one or more motion states of the device associated with a user. As used herein, "motion state," "ontological state," "state," "event," or the plural form of such terms may be used interchangeably and may refer to one or more conceptual representations descriptive of a particular momentum-related condition or a set of conditions of an object of interest (e.g., a user, mobile device, etc.). Particular examples of a state may include, for example, walking, standing, sitting, running, cycling, jogging, jumping, skiing, being on a plane or vehicle, or the like, though claimed subject matter is not so limited. In some instances, a state may comprise, for example, a change in one or more momentum-related aspects or characteristics associated with a particular condition or a set of conditions, such as a transition from "standing" to "sitting," which may be used interchangeably with a state of "being seated." At times, a state may comprise a number of sub-states. For example, a state "jumping" may comprise sub-states like "leaping," "flying," "landing," or the like. Again, claimed subject matter is not so limited. In some instances, a mobile device may integrate or fuse in some manner measurement signals obtained or received from multiple sensors, for example, so as to make a more complete, accurate, or otherwise sufficient inference or classification of a motion state of a user that is holding, carrying, wearing, operating, etc. the device. As will be described in greater below, a mobile device may, for example, infer or classify a motion state of a user while being co-located with a portion of the user's body, such as in a pocket, belt clip, armband, or the like. In some instances, a motion state may be inferred or classified, for example, with respect to a user that is operating a mobile device while being in a relatively stationary position or so-called a motion state of rest, as will also be seen.

As was indicated, a mobile device may include, for example, a number of inertial or motion sensors, such as one or more accelerometers, gyroscopes, gravitometers, tilt sensors, magnetometers, or the like. These sensors, as well as other possible inertial sensors not listed, may be capable of providing signals for use by a variety of host applications, for example, while measuring various states of a mobile device using appropriate techniques. An accelerometer, for example, may sense a direction of gravity toward the center of the Earth and may detect or measure a motion with reference to one, two, or three directions often referenced in a Cartesian coordinate space as dimensions or axes X, Y, and Z. Optionally or alternatively, an accelerometer may also provide measurements of magnitude of various accelerations, for example. A direction of gravity may be measured in relation to any suitable frame of reference, such as, for example, in a coordinate system in which the origin or initial point of gravity vectors is fixed to or moves with a mobile device. An example coordinate system that may be used, in whole or in part, to facilitate or support one or more processes in connection with machine learning of known or unknown motion states with sensor fusion will be described in greater detail below in connection with FIG. 1. A gyroscope may utilize the Coriolis effect and may provide angular rate measurements in roll, pitch, or yaw dimensions and may be used, for example, in applications determining heading or azimuth changes. A magnetometer may measure the direction of a magnetic field in X, Y, Z dimensions and may be used, for example, in sensing true North or absolute heading in various navigation applications.

Following the above discussion, measurement signals received or obtained from multiple sensors may be fused or integrated in some manner so as to make a more complete, accurate, or otherwise sufficient inference or classification of a motion state of a user associated with a mobile device. FIG. 1 illustrates an implementation of an example coordinate system 100 that may be used, in whole or in part, to facilitate or support one or more operations or techniques for machine learning of known or unknown motion states with sensor fusion for use in or with a mobile device, such as a mobile device 102, for example. As illustrated, example coordinate system 100 may comprise, for example, three-dimensional Cartesian coordinate system, though claimed subject matter is not so limited. In this illustrated example, one or more translational aspects or characteristics of motion of mobile device 102 representing, for example, acceleration vibration may be detected or measured, at least in part, by a suitable accelerometer, such as a 3D accelerometer, with reference to three dimensions or axes X, Y, and Z relative to an origin 104 of example coordinate system 100. It should be appreciated that example coordinate system 100 may or may not be aligned with a body of mobile device 102. It should also be noted that in certain implementations a non-Cartesian coordinate system may be used or that a coordinate system may define dimensions that are mutually orthogonal.

One or more rotational aspects or characteristics of motion of mobile device 102, such as orientation changes about gravity, for example, may also be detected or measured, at least in part, by a suitable accelerometer with reference to one or two dimensions. For example, rotational motion of mobile device 102 may be detected or measured in terms of coordinates (φ, τ), where phi (φ) represents roll or rotation about an X axis, as illustrated generally by arrow at 106, and tau (τ) represents pitch or rotation about an Y axis, as illustrated generally at 108. Accordingly, here, a 3D accelerometer may detect or measure, at least in part, a level of acceleration vibration as well as a change about gravity with respect to roll or pitch dimensions, for example, thus, providing five dimensions of observability (X, Y, Z, φ, τ). It should be understood, however, that these are merely examples of various motions that may be detected or measured, at least in part, by an accelerometer with reference to example coordinate system 100, and that claimed subject matter is not limited to these particular motions or coordinate system.

At times, one or more rotational aspects or characteristics of motion of mobile device 102 may, for example, be detected or measured, at least in part, by a suitable gyroscope capable of providing adequate degrees of observability, just to illustrate another possible implementation. For example, a gyroscope may detect or measure rotational motion of mobile device 102 with reference to one, two, or three dimensions. Thus, gyroscopic rotation may, for example, be detected or measured, at least in part, in terms of coordinates (φ, τ, ψ), where phi (φ) represents roll or rotation 106 about an X axis, tau (τ) represents pitch or rotation 108 about an Y axis, and psi (ψ) represents yaw or rotation about a Z axis, as referenced generally at 110. A gyroscope may typically, although not necessarily, provide measurements in terms of angular acceleration or vibration (e.g., a change in an angle per unit of time squared), angular velocity (e.g., a change in an angle per unit of time), or the like. Of course, details relating to various motions that may be detected or measured, at least in part, by a gyroscope with reference to example coordinate system 100 are merely examples, and claimed subject matter is not so limited.

In certain implementations, mobile device 102 may include one or more ambient environment or like sensors, such as, for example, an ambient light detector, a proximity sensor, a temperature sensor, a barometric pressure sensor, or the like. For example, a proximity sensor may typically comprise an infrared (IR) emitter-receiver pair placed sufficiently closely on mobile device 102 so as to detect a presence of nearby objects, measure a distance to such objects, etc. without physical contact. A proximity sensor may be often featured in mobile devices to turn off a display while not in use, for example, deactivate a touch screen to avoid unwanted input during a call, or the like. Certain implementations of mobile device 102 may feature an ambient light detector to help in adjusting a touch screen backlighting or visibility of a display in a dimly lit environment, for example, via measuring an increase in luminous intensity of the ambient light. Ambient environment sensors are generally known and need not be described here in greater detail. It should be appreciated that in some example implementations mobile device 102 may include other types of sensors beyond sensors listed herein so as to provide measurement signals that may be fused in some manner or utilized separately, at least in part, to infer or classify a motion state of an associated user. For example, measurement signals from a built-in digital camera that track optical motion of an object in the image viewer may be employed or otherwise considered, at least in part, for motion state inference or classification, just to illustrate another possible implementation.

As alluded to previously, how to design or implement a machine learning approach for mobile devices to be able to understand what associated users are doing (e.g., intentions, goals, etc.) so as to assist, participate, or, at times, intervene in a more meaningful way, for example, continues to be an area of development. Typical approaches to motion state classification or sensor fusion may include, for example, utilizing a certain training sequence, such as a one or two step process of reducing raw sensor input parameters to a more practical or otherwise suitable set. In some instances, this may be implemented, for example, via compressed sensing, heuristically derived secondary parameters, Linear Discriminant Analysis (LDA), or like techniques. A set may then be utilized, at least in part, in a statistical classification computation using, for example, a Support Vector Machine (SVM), string-matching, neural network, Hidden Markov Model (HMM), or the like. These approaches, however, typically work by training models on known states, which may require rather significant or otherwise enhanced training, for example, and are typically validated based, at least in part, on recognizing known states that a machine learning system was previously trained on. Since a typical goal of these approaches is to recognize known states after using a significant amount of training data or information (e.g., datasets, training sets, etc.), such a system may have difficulties recognizing unknown states "on-the-fly," such as, for example, in real-time or near real time. In this context, "real time" may refer to an amount of timeliness of data or information, which may have been delayed by an amount of time attributable to electronic communication as well as other information or signal processing.

Yet, recognizing unknown states may be advantageous because humans are unique. For example, one person may take a first action in a same or similar state that another person would take a different second action. Moreover, it may be somewhat impractical or less than desirable to develop a machine learning system that was pre-trained on all or most possible states for all or most possible users or, in some instances, even for one user. Furthermore, mobile devices in which sensors are often embedded may vary, and, as such, it may be desirable to develop a flexible machine learning approach that would not be tailored to a particular implementation of a mobile device. While pre-trained states may be useful as a starting point, for example, an intelligent mobile device may be capable of learning new unknown states. Learning unknown states via typical approaches, however, may not provide a sufficiently complete or feasible solution since they attempt to relate sensor features to known classes of motion, as was mentioned above.

Furthermore, certain state-of-the-art sensor systems may employ or utilize multiple sensor locations on a human body, such as waist, wrists, or legs, for example, to achieve a particular level of performance. Moreover, these sensors are typically firmly fixed in position. Another challenge may be that relatively often typical machine learning approaches assume that all or most of sensors are turned on. Yet mobile devices often are battery-powered and, while on, sensors may reduce operating lifetime of such devices. Thus, it may be advantageous to develop a machine learning approach that may infer or classify known motion states as well as learn new states with a subset of sensors turned on or intelligently activated with different or variable parameters (e.g., rate, frequency, etc.), as appropriate.

Another challenge with typical approaches may be that generally a significant or relatively large amount of a user-device interaction may take place for new state learning. This may be inconvenient at times since such state learning may include multiple attempts or iterations for a particular level of performance or success. To illustrate, at times, a user may need or find it useful to specifically communicate or tell a mobile device that the user is "jogging," such as at the start and the end of a jog, for example, in order for the device to learn an ontological state of "jogging" to set a ringer to ignore calls while in this state. An intelligent mobile device may, for example, be able to learn an unknown motion state that is consistently, continually, or otherwise sufficiently encountered without or at least with a lesser amount of a user-device interaction. Such a device may also be capable of correlating new state learning with user behavior in order to make a user-device interaction more meaningful. For example, a mobile device may observe that a user does not take calls (e.g., presses ignore key, does not answer, etc.) while in some consistently, continually, or otherwise sufficiently distinguishable state and, thus, may mute a ringer accordingly. Particular examples of unknown distinguishable motion states will be described in greater detail below. Of course, this is merely an example relating to a particular user-device interaction, and claimed subject matter is not limited in this regard.

In addition, training is typically, although not necessarily, undertaken on all or most states at once so that a machine learning system may distinguish between these states. If a new state is added, for example, a system may then be updated to reflect the addition of a new state. Thus, it may be advantageous to perform a system update without, for example, retraining a relatively large amount of training data or information or, optionally or alternatively, without retraining a system at all. Accordingly, it may be desirable to develop one or more methods, systems, or apparatuses that may implement effective or efficient motion sensing including, for example, learning new unknown states, refining classification of known states, as well as operating in a flexible sensor fusion configuration.

Figure 2:
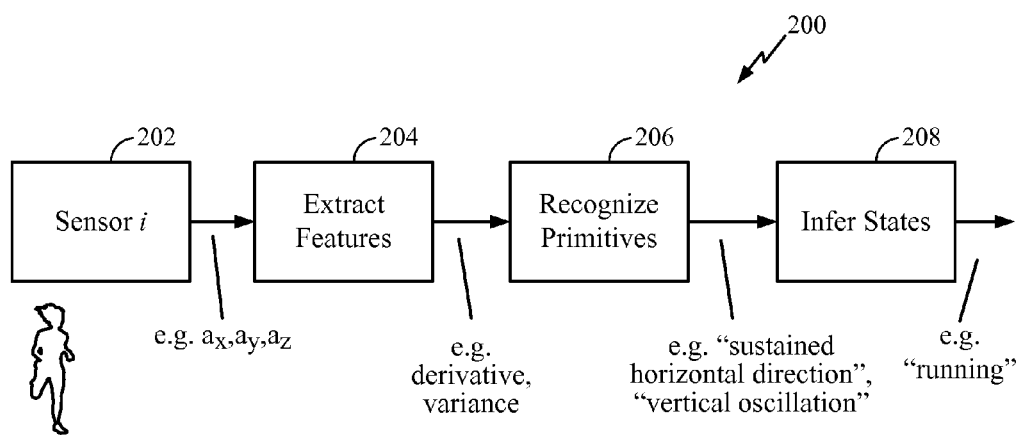
FIG. 2 is a flow diagram illustrating an implementation of an example process for inferring or classifying a known motion state.

FIG. 2 is a flow diagram illustrating an implementation of an example process 200 conceptually realized herein as a framework of stages or operations that may be performed, in whole or in part, to infer or classify a learned or known motion state. It should be noted that information acquired or produced, such as, for example, input signals, output signals, operations, results, etc. associated with example process 200 may be represented by one or more digital signals. It should also be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 200 may begin at stage or operation 202 with obtaining measurement signals from one or more sensors associated with a mobile device, such as, for example, sensors described above in connection with FIG. 1. As previously mentioned, measurement signals may comprise, for example, multi-axes signal values $a_x$, $a_y$, $a_z$ sampled or provided by an accelerometer with respect to three dimensions or axes X, Y, Z, respectively, just to illustrate one possible implementation. In some instances, measurement signals with respect to angular rate measurements in roll, pitch, or yaw dimensions may be sampled or provided by a suitable gyroscope, as another possible example.

At operation 204, one or more suitable features may be extracted or derived from measurement signals using one or more appropriate techniques. As used herein, "feature" may refer to a fundamental or otherwise suitable unit of information capable of being measured, perceived, observed, or otherwise processed in some manner in connection with sampled or obtained measurement signals. By way of example but not limitation, a feature may comprise, for example, a variance across some time window, a derivative or rate of change of sampled signal values over time, a vertical velocity, means of individual variables over some time window, co-variances, auto-correlations, energy, or the like. In some instances, one or more features may be pre-defined in some manner, such as by a user of a mobile device, manufacturer, provider, or the like. For example, one or more features may be pre-defined with respect to some aspect, parameter, characteristic, etc. of interest in connection with sampled or obtained measurement signals. It should be appreciated that these are merely examples of features to which claimed subject matter is not limited.

In an implementation, one or more features extracted or derived with respect to sensor S from sampled or batch sensor output signals $\vec{x}_s$ may, for example, be denoted by a vector in a sensor's feature space $\vec{f}_s$, where each feature (e.g., index i, etc.) may comprise a function of $f_i(x)$ of one or more sensor output signals. Thus, consider, for example:

$$\vec{f}_s \triangleq \{f_i(\vec{x}_s) \forall i\} \quad (1)$$

In some instances, one or more sensor output signals may correspond, for example, to a particular time instant or, optionally or alternatively, comprise a batch of samples over some time window, such as a sample block. At times, certain features may be compressed, for example, by selecting a value or index of peak values or peak co-variances. It should also be noted that if certain features are known to be associated with a particular sensor, for example, feature-related heuristic knowledge may be defined in a feature extraction for that sensor. For example, one or more temporal derivatives of accelerometer vector components may be defined or characterized, at least in part, as features. Also, in some instances, it may be advantageous to consider extracting or deriving as many reasonable or otherwise suitable features as possible or statistically desirable, for example, rather than compressing a feature space. In certain implementations, feature dimensions may be less than sensor measurement dimensions, for example, but it may be useful to omit a respective compression operation. At times, features may, for example, compress measurement signals if there is some redundancy in input signals from a sensor. In addition, sampling may be compressed, for example, if a sensor sampling rate is reduced by sensor management. Of course, these are merely example details relating to feature extraction, and claimed subject matter is not limited in this regard.

With respect to operation 206, based, at least in part, on one or more extracted or derived features, one or more primitives may be recognized or classified in some manner. As used herein, the term "primitive" is to be interpreted broadly and may refer to a conceptual characterization of one or more electronically detectable sensory perceptions that may be representative of an input to an inference about a motion state. For example, in an implementation, a primitive may comprise or otherwise correspond to one or more physical realizations of an ontological state. To illustrate, one person may, for example, run or jump differently than another person or a particular person may run or jump in different ways. Here, a primitive may comprise or correspond to a sub-state of an ontological state, such as, for example, a leaping, flying, or landing stage of a jump, for example, or a vertical oscillation, sustained horizontal direction, etc. stage of a run, though claimed subject matter is not so limited. In some instances, a primitive may correspond to a characteristic of an ontological state, such as, for example, one or more translational characteristics of exercising (e.g., detected via an accelerometer, etc.), rotational characteristics of exercising (e.g., detected via a gyroscope, etc.), or the like.

At times, a primitive may, for example, comprise or correspond to an atomic motion or a particular sub-state of sensor feature over some time window, a characteristic of a particular ontological state, or like motion transformation, or any combination thereof. For purposes of explanation but without loss of generality, a notion of primitive may be conceptualized, for example, via words like "CAR," "ARC," "RACE," etc. representing particular classes of motion in which letters C, A, E, or R represent primitives, and horizontal or vertical lines or pixels represent features. It should be appreciated that these are merely examples relating to primitives, classes of motion, or features, and claimed subject matter is not limited in this regard. It should also be noted that in some instances it may be more advantageous or otherwise useful to discover primitives, for example, rather than define their contours, as described below.

In certain implementations, one or more primitives may be recognized based, at least in part, on extracted features via a two-step operation in abstract spaces, such as, for example, a transformation operation to potentially increase dimensionality and a classification or mapping operation, though claimed subject matter is not so limited. Here, a primitive $P_t$ may, for example, be defined or described by a kernel $K_t$, map $M_t$, and feature dependency descriptor $\vec{d}_t$ as:

$$P_t \triangleq \{K_t, M_t, \vec{d}_t\} \quad (2)$$

where a primitive kernel descriptor may comprise, for example, a set of transforms, which may apply to one or more feature space vectors, or:

$$K_t \triangleq \{t'_{t,j} \forall j\} \quad (3)$$

A transform may be defined or described by one or more appropriate coefficients, for example, or a transform equation structure itself, denoted $g_t$, which is omitted herein from a kernel descriptor $K_t$ representation for purposes of clarity, since the equation structure may be consistent across all or most kernels. Thus, although the retention of the sub-script is on $g_t$, for example, in some instances $g_t = g$ may also be used or otherwise considered. Individual coefficients may, for example, be denoted via $c_{t,j,n}$. Thus, consider:

$$\vec{t}_{t,j} \triangleq \{c_{t,j,n}\} \quad (4)$$

Accordingly, a kernel output may, for example, be computed from extracted features as:

$$\vec{k}_t \triangleq \{g_t(\vec{t}_{t,j},\{\vec{f}_s | s \in \vec{d}_t\}) \forall j\} \quad (5)$$

In an implementation, a linear kernel may be represented, for example, via an equation form of a dot product, though claimed subject matter is not so limited. In some instances, one or more non-linear kernels may also be utilized. While one or more coefficients for linear kernels or transformations may typically, although not necessarily, be solved for under given constraints, for example, utilization of non-linear kernels may present certain challenges. However, once one or more coefficients are derived (e.g., randomly, via a genetic algorithm, etc.), non-linear kernels may, for example, allow for transformation from a feature space into a kernel or transform space, where a linear classifier may be utilized or otherwise considered. A number of coefficients per transform may depend, for example, on a type or structure of a transform equation.

As a way of illustration, some examples of various types of transforms that may be utilized or otherwise considered, in whole or in part, may include those shown in Table 1 below.

It should be appreciated that transforms are shown as merely examples to which claimed subject matter is not limited.

TABLE 1

Example transforms.

| Transform Type | Transform Equation | Coefficients per Transform |
|---|---|---|
| Linear | $g_t(\vec{c}, \vec{f}) \triangleq \left(\sum_i c_i f_i\right)$ | $|\vec{f}|$ |
| Homogeneous pair-wise sparse polynomial | $g_t(\vec{c}, \vec{f}) \triangleq \left(\sum_i \sum_j c_{i,f}(f_i f_j)^\omega\right)$ | $|\vec{f}|^2$ |
| Non-homogeneous pair-wise sparse polynomial | $g_t(\vec{c}, \vec{f}) \triangleq \left(\sum_i \sum_j c_{i,f,1}(f_i f_j)^{c_{i,j,n}}\right)$ | $2|\vec{f}|^2$ |
| Non-homogeneous pair-wise sparse polynomial alternate form | $g_t(\vec{c}, \vec{f}) \triangleq \left(\sum_i c_{i,1} f_i^{c_{i,n}}\right)\left(\sum_i c_{i,2} f_i^{c_{i,j}}\right)$ | $4|\vec{f}|$ |
| General polynomial | $g_t(\vec{c}, \vec{f}) \triangleq \sum_i^N c_i \prod_j f_j^{c_{i,j}}$ | $N(|\vec{f}|+1)$ |

In an implementation, one or more primitive abstracts $\vec{m}_t$ as well as confidences $\vec{p}_t$ may, for example, be computed from a primitive classifier $n_t$ as:

$$\{\vec{m}_t, \vec{p}_t\} \triangleq h_t(\vec{k}_t, M_t) \quad (6)$$

As a way of illustration, a classifier may be a derived (e.g., trained, etc.), for example, using any suitable delineating method or approach, such as a linear or non-linear support vector machine (SVM), clustering-type (e.g., k-means, etc.) method, or the like. In the former approach, a primitive may be determined, at least in part, by how distinctly one or more features fall away from an optimized border between two bins or a pair of bins, for example, while in the latter, a primitive may be determined, at least in part, by how well one or more features fall into an optimized bin or each bin. Since delineations may form bins between them and delineations are formed between bins, a classifier may be described by a primitive's map descriptor $M_t M_t$, which may be obtained, for example, via suitable training.

In a delineating-type approach, a non-linear transformation may, for example, be integrated into a non-linear classifier. For example, as was indicated, a positive semi-definite kernel function may comprise a dot product of transform functions, such that $$\kappa(\vec{t}, \vec{a}, \vec{b}) \triangleq g_t(\vec{t}, \vec{a}) \cdot g_t(\vec{t}, \vec{b})$$

or, optionally or alternatively, may be obtained independently from a linear classifier, such as a non-linear transform on input signals to a linear classifier. Output signals of a classifier may comprise, for example, primitive mapping and statistics descriptions.

In case of a clustering-type approach or method via describing bins, for example, one or more centroids, such as $|\vec{k}_t|$ dimensional vector $\vec{\mu}_{t,j}$, and cluster distribution statistics, such as standard deviation of distance from each centroid $\sigma_{i,j}$, may be generated. By way of example but not limitation, a primitive map descriptor $M_t \triangleq \{C_{t,j} \forall j\}$, where $C_{t,j} \triangleq \{\vec{\mu}_{t,j}, \sigma_{t,j}\}$ may, for example be obtained or derived from k-means, just to illustrate one possible implementation. Thus, a confidence measure or metric $p_{t,j}$ may be computed per a suitable cluster using, for example, Euclidean distance $$d_{i,j} \triangleq \sqrt{\sum_n (\vec{k}_i(n) - \mu_{i,j}(n))^2}$$

as:

$$p_{i,j} \triangleq 1 - orf\left(\frac{d_{i,j}}{\sigma_{t,l}}\right) \quad (7)$$

In an implementation, a primitive may, for example, be defined or characterized via a scalar abstract $\vec{m}_t = m_t$ and confidence $\vec{p}_t = p_t$ by selecting a cluster with a best or otherwise suitable confidence or smallest or otherwise suitable distance, respectively. Thus, consider, for example:

$$m_t \triangleq \operatorname{argmax}_j(p_{t,j}) \text{ or } m_t \triangleq \operatorname{argmin}_j(d_{t,j}) \text{ and } p_t = p_{t,m_t} \quad (8)$$

In case of a clustering-type approach or method via a multi-class discriminator or pairs of bins, for example, one or more hyper-planes in a transformed space or pairs of hyper-plane separators may be constructed or obtained. These may be obtained via an SVM, for example, such that $M_t \triangleq \{C_{t,j} \forall j\}$, where each $C_{t,j}$ may describe a hyper-plane in a transformed feature space and applicable distribution statistics or $C_{i,j} \triangleq \{\vec{w}_{i,j}, \sigma_{i,j}\}$. In some instances, it may be advantageous to generalize that an affine hyper-plane offset may be included, for example, as a member of a weight vector, though claimed subject matter is not so limited. Here, a confidence measure or metric may be computed as per discriminator described above, for example, given one or more hyper-planes and distribution statistics, using Euclidean distance from a suitable point on a plane (e.g., a nearest point, etc.) $d'_{i,j}$, where j denotes an index of a discriminator.

A confidence measure or metric per cluster may then be computed using one or more suitable approaches. For example, in an implementation, a confidence measure or metric per cluster may be computed using a so-called "one-versus-all" or best discriminator's confidence-type approach, though claimed subject matter is not so limited. Optionally or alternatively, a so-called "one-versus-one" approach or combination of discriminator confidences involving a confidence cluster, for example, may also be used or otherwise considered. Here, a primitive may, for example, be defined with a scalar abstract and confidence as discussed above, such as by selecting a cluster (e.g., a bin, etc.) with a best or otherwise suitable confidence or smallest or otherwise suitable distance. In other words, a discriminator with a suitable confidence may be used, at least in part, to determine a cluster and confidence or, optionally or alternatively, a cluster with a suitable amount of votes or weightage (e.g., weighted by confidence, etc.), for example, may be utilized to determine a cluster and confidence. In some instances, a primitive may, for example, be defined in discriminator output terms, such as by cluster-pairs rather than clusters. This may increase a dimensionality of a primitive, for example, in which case pair combinations may be pruned or otherwise reduced in some manner, such as to a most significant or confidence discriminating pairs, as one possible example. It should be appreciated that claimed subject matter is not limited to these particular approaches, and that various other alternatives consistent with the scope or spirit of claimed subject matter may also be employed.

As illustrated, at operation 208, based, at least in part, on one or more recognized primitives, a known or learned motion state, such as "running," for example, may be inferred or classified in some manner. For example, in an implementation, such an inference or classification may be made autonomously or without a specific input or hint (e.g., pressing a key or button, etc.) from a user of a mobile device. Here, one or more probabilistic reasoning techniques may be employed, though claimed subject matter is not limited in this regard. For example, a single-shot probabilistic inference of a known motion state $S_a$ may be given (e.g., as part of training, etc.) by one or more output signals of one or more primitives via respective values $\{\vec{m}_t\}$ or probabilities/confidences $\{\vec{p}_t\}$, where a primitive may have one or more values or associated confidences, as:

$$P\{s_a | \{\vec{m}_t, \vec{p}_t\} \forall i\} \quad (9)$$

A known motion state inference or classification may, for example, then be implemented as a simple vote by defining or characterizing the vote of an individual primitive v(i) as:

$$v(i) = \operatorname*{argmax}_k (P\{s_k | \{\vec{m}_i, \vec{p}_i\}\}) \quad (10)$$

In some instances, a vote may be conditioned, for example, on a confidence of a primitive, though claimed subject matter is not so limited. For example, a vote may be determined based, at least in part, on a learned probability distribution function (PDF) (e.g. a normal distribution, etc.) of primitives' values for each motion state. If a primitive yields a single value $p_t$, rather than a vector of values, for example, and such a single value may be mapped to a motion state, a vote may be simplified via appropriate techniques. A classification or inference of known motion states may, for example, be performed by determining whichever state gets the most votes or at least a suitable number of votes. At times, this may be conditioned (e.g., weighted, etc.) based, at least in part, on vote confidences, which, in turn, may be based, at least in part, on primitive confidences. Of course, these are merely examples relating to a probabilistic inference technique in connection with classification of a known motion state, and claimed subject matter is not so limited.

Figure 3:
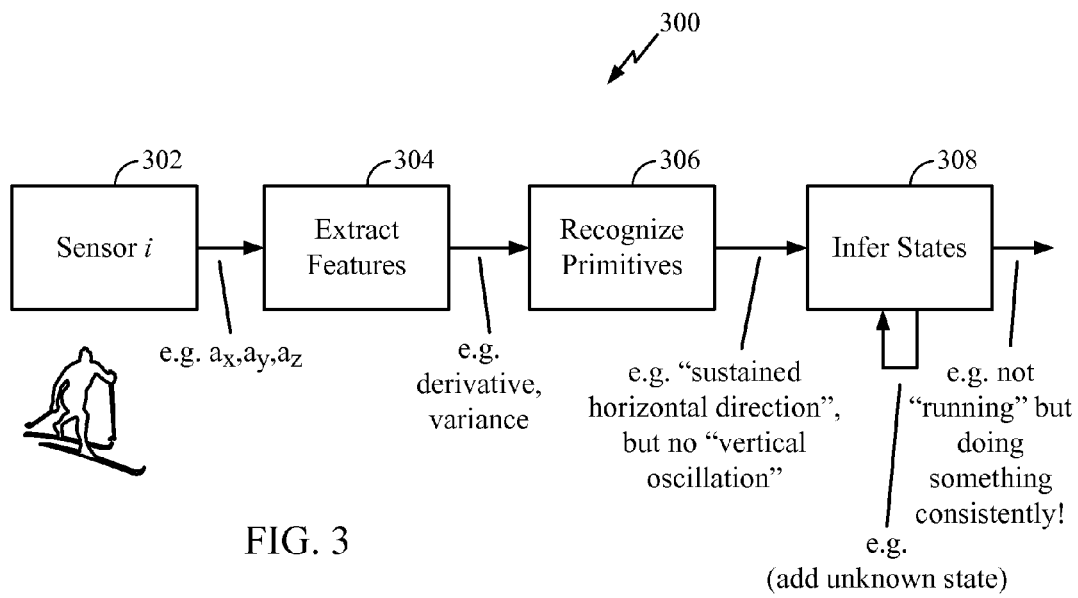
FIG. 3 is a flow diagram illustrating an implementation of an example process for inferring or classifying an unknown distinguishable motion state.

FIG. 3 is a flow diagram illustrating an implementation of an example process 300 that may be performed, in whole or in part, to infer or classify an unknown distinguishable (UD) motion state, defined below. Again, it should be noted that information acquired or produced, such as, for example, input signals, output signals, operations, results, etc. associated with example process 300 may be represented by one or more digital signals. It should also be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

At operation 302, one or more measurement signals may be obtained in some manner from one or more sensors associated with a mobile device using one or more appropriate techniques, such as, for example, techniques described in connection with FIGS. 1-2 above. As was indicated, in some instances, measurement signals may comprise, for example, multi-axes accelerometer signal sample values $a_x$, $a_y$, $a_z$, just to illustrate one possible implementation. Again, claimed subject matter is not so limited, of course. With regard to operation 304, one or more suitable features (e.g., a co-variance, auto-correlation, vertical velocity, derivative, etc.) may be extracted or derived from measurement signals in some manner, such as, for example, in a manner described above.

At operation 306, based, at least in part, on one or more extracted or derived features, one or more primitives may be recognized or classified using, for example, one or more techniques discussed above. As previously mentioned, a primitive may comprise, for example, a physical realization of an ontological state, a sub-state of an ontological state, a characteristic of an ontological state, etc., or any combination thereof. More specifically, here, an existing or recognized primitive(s) may, for example, form or comprise a new logical combination that was previously unknown but is ascertainable or capable of being recognized or identified (e.g., distinguished, etc.) based, at least in part, on some continual, consistent, or otherwise sufficient motion transformation. As illustrated, by way of example but not limitation, a new logical primitive combination may comprise, for example, a logical expression or a sequence of primitives, such as "sustained horizontal direction, but no vertical oscillation," though claimed subject matter is not so limited.

At operation 308, based, at least in part, on a new logical primitive combination, an unknown distinguishable (UD) state may be inferred or classified in some manner. As used herein, "unknown distinguishable" state may refer to a motion state that was previously unknown but is consistently, continually, or otherwise sufficiently encountered or repeated so as to be capable of being identified or recognized via an applicable state inference or like processing logic. For example, a user may engage in a certain activity, such as skiing, which may correspond to a new logical primitive combination, as mentioned above, that is unknown to a mobile device but may be distinguished from other logical combinations of one or more existing primitives. In other words, a mobile device may, for example, recognize that a user in not quite "running" or "jogging" but doing something consistently, continually, or otherwise sufficiently so as to infer or classify a new motion state (e.g., "skiing," etc.). Of course, claimed subject matter is not limited to particular state descriptions.

Furthermore, in an implementation, a mobile device may infer or classify an unknown but distinguishable motion state even though such a state does not have an ontological term or association yet or, in some instances, may never have such a term or association. More specifically, a mobile device may, for example, be capable of distinguishing a known motion state from an unknown state and vice versa or an unknown state from another unknown state that may not have a known or related ontological term or name yet. In this context, "unknown" may refer to a motion state that was previously unknown but may become known once identified or classified as a recurring distinguishable state. It may, thus, become a known state, for example, but may not necessarily have a name, as was indicated.

As alluded to previously, an unknown distinguishable state may, for example, be described as one or more primitive patterns that may be not known from training. Here, to infer or classify an unknown distinguishable state, a distance (e.g., similarity, etc.) of an observed primitive output pattern to one or more known state inference patterns may be computed using appropriate techniques. If a distance is relatively small, thus, indicating a higher degree of similarity, for example, a known state may be probabilistically inferred or classified, given confidences of primitives, as described above. However, if a primitive pattern is somewhat significantly or otherwise sufficiently different from patterns facilitating or supporting known state inferences, for example, a new unknown state may be detected or inferred. If the same or similar primitive pattern is observed continually, consistently, or otherwise sufficiently, for example, an unknown state may be distinguished from one or more known states as well as from null or unknown indistinguishable states, defined below, and, thus, may be learned without a discovery or addition of one or more new primitives. This may provide an advantage since a few primitives may represent a sufficient basis (e.g., via a set of linearly independent vectors, etc.), orthogonal or otherwise, and may be combined in a relatively large number of combinations useful to infer or classify a larger number of previously known or unknown motion states.

In an implementation, an unknown distinguishable state may, for example, be determined autonomously, such as without specific user input, hint, or like user-device interaction, as previously mentioned. At times, an unknown distinguishable state may be inferred or classified semi-autonomously, for example, meaning that a state inference or classification may occur based, at least in part, on a user's hint. To illustrate, if a user presses an "ignore call" key continually, consistently, or otherwise sufficiently so as to make a "primitive(s)—motion state" correlation or connection, for example, while a mobile device rings during an unknown distinguishable state, as defined above, it may be inferred that a user is "in a meeting." Other examples of user hints may include, for example, continually, consistently, etc. playing music, checking a calendar, muting a ringer, turning off a mobile device, or the like. Accordingly, motion state inference learning may, for example, assemble one or more logical inferences based, at least in part, on one or more existing or available primitives corresponding to such one or more hints. As will be seen, state inference logic may be updated (e.g., added to state classification knowledge, etc.) via a suitable machine learning aspect or process, for example, so that a motion state may be inferred or classified in the future (e.g., next occurrence, etc.). However, these are merely examples of hints or motion states, and claimed subject matter is not limited in scope in these respects.

Figure 4:
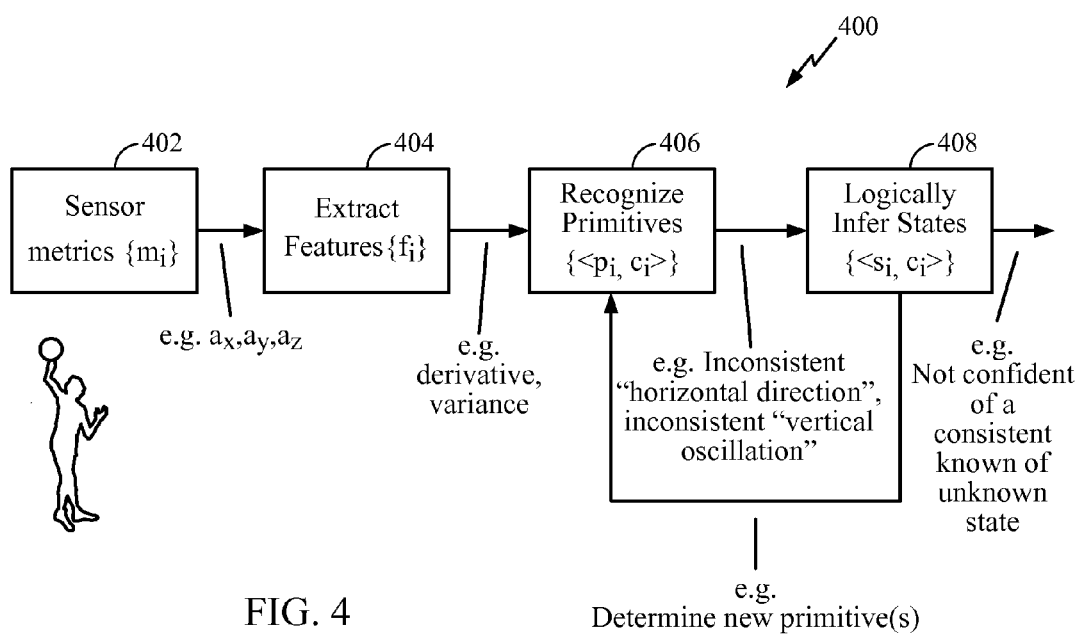
FIG. 4 is a flow diagram illustrating an implementation of an example process for inferring or classifying an unknown indistinguishable motion state.

FIG. 4 is a flow diagram illustrating an implementation of an example process 400 that may be performed, in whole or in part, to infer or classify an unknown indistinguishable (UID) motion state, defined below. Again, it should be noted that information acquired or produced, such as, for example, input signals, output signals, operations, results, etc. associated with example process 400 may be represented by one or more digital signals. It should also be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

In an implementation, operations 402 and 404 may be performed, in whole or in part, in a manner similar to corresponding operations of FIGS. 2-3, such as, for example, operations 202 and 204 or operations 302 and 304, respectively. With regard to operation 406, one or more primitives may, for example, be recognized or discovered so as to facilitate or support inference or classification of an unknown indistinguishable (UID) motion state. As used herein, "unknown indistinguishable" state, "inconsistently distinguishable" state, or the plural form of such terms may be used interchangeably and may refer to a motion state that was previously unknown but may not be distinguished from one or more known or unknown motion states based, at least in part on some existing logical expression or combination of primitives. For example, a mobile device may detect or recognize, at least in part, a new or unknown logical sequence or combination of primitives, such as "inconsistent horizontal direction," "inconsistent vertical oscillation," etc. representative of a new motion state, but there may be less confidence or consistency observed to sufficiently make a known-unknown or unknown-unknown motion state distinction. To illustrate, a user may play music regularly or otherwise sufficiently, for example, but motion state inference logic may be unable to determine a continually, consistently, etc. distinguishable unknown motion state corresponding to user's actions. In such a case, a mobile device may initiate new primitive discovery to find one or more motion-related characteristics or patterns that may be helpful in distinguishing a motion state, for example, and may use new primitives to build a state inference, as will be described below. In other words, new primitive discovery may be initiated if, for example, one or more additional primitives may be needed or otherwise useful to distinguish an unknown indistinguishable or inconsistently distinguishable motion state. New primitive discovery may, for example, continue until a sufficiently distinct primitive pattern is found. In some instances, such a pattern may comprise, for example, a pattern that may help to distinguish a new unknown motion state from one or more other known or unknown motion states. Classification knowledge may be updated with a new determined or discovered primitive pattern, for example, and one or more new primitives may be stored or otherwise retained in some manner, as will also be seen.

In an implementation, to facilitate or support primitive discovery, in addition to or instead of one or more primitive clustering approaches discussed above (e.g., a delineating-type approach, clustering-type approach, etc.), an over-clustering-type approach may also be employed or otherwise considered. For unknown or new state inferences, an important or otherwise useful aspect of primitives may, for example, include diversity across one or more motion states, such as known states, null or unknown indistinguishable states, or unknown distinguishable states. As previously mentioned, a clustering-type approach (e.g., k-means, etc.) may typically, although not necessarily, lend itself to abstracting one or more clusters or bins from one or more motion states, meaning that a cluster or bin may not necessarily be representative of one-to-one or even many-to-one relations with respect to motion states. In some instances, mapping may then be determined afterward. Delineating-type approaches (e.g., SVM, etc.), however, may integrate motion state a priori knowledge into a delineation task. In this context, a priori knowledge may refer, for example, to some prior or existing knowledge about some aspect, domain, parameter, characteristic, etc. of interest, rather than a knowledge estimated by a current or relatively recent observation with respect to such an aspect, domain, parameter, characteristic, etc. Thus, an over-clustering-type approach may, for example, be used, at least in part, to determine more clusters or bins than motion states via one or more appropriate techniques.

For example, in an implementation, one technique may include retaining a high-dimensionality of pair-wise discrimination results rather than reducing by voting or choosing a single winner. In other words, a discriminator that may identify a winning cluster rather than a cluster itself, for example, may be used. In some instances, a technique may include, for example, splitting training samples into one or more sub-bins so as to magnify a number of discrimination combinations. This may be accomplished via k-means within each state, for example, by splitting each of M states into a number of N sub-states, for example, and training respective discriminators (e.g., (N×M)×(N×M), etc.). Accordingly, output signals of a primitive may, for example, include many-to-one mapping to trained motion states. An over-clustering-type approach, thus, may facilitate or support primitive diversity. For example, by over-clustering in discriminator or clustering modes, different patterns of primitives may be generated or otherwise obtained, which may help to identify known as well as distinguish new unknown motion states. In addition, an advantage of an over-clustering-type approach may be that a required or otherwise useful number of primitives to classify a given number of states may grow logarithmically (e.g., reach a plateau, etc.) instead of with a square of a number of states. Of course, such a description of an over-clustering-type approach or its benefits is merely an example, and claimed subject matter is not so limited. It should also be appreciated that any suitable combination of techniques mentioned above may be utilized or otherwise considered.

In certain implementations, a random component may, for example, be desirable or otherwise useful. For example, a primitive may be modeled by a kernel as well as cluster statistics, as previously mentioned. One or more non-linear kernels may be discovered via an application of a genetic algorithm-type process or approach comprising, for example, randomness in one or more initial kernels and mutation (e.g., evolution stages, etc.). Based, at least in part, on a genetic algorithm-type process, well-performing or otherwise sufficiently-performing kernels may, for example, be crossed with one another randomly and randomly mutated. Upon or after an iteration, best or otherwise suitable kernels may be retained for a next round. For example, ten kernels may be kept at each round and may yield a new population of more than 10 kernels from which a next stage of best or otherwise suitable kernels may be selected. Claimed subject matter is not so limited, of course. Any suitable or desired number of kernels may be utilized. It should be noted that, at times, a number of primitives may increase slower than an increase in number of states, for example, since certain combinations of primitives may grow exponentially with a diverse primitive set.

Continuing with the above discussion, a kernel may, for example, comprise one or more transforms, which may translate one or more feature space values into one or more transform values. By way of example but not limitation, in certain simulations or experiments, ten transforms (e.g., 10D kernel, etc.) were used. It should be appreciated that in some instances primitives may not have the same or similar number of transforms or use the same or similar features. Output signals of one or more transforms may be clustered by a suitable clustering-type process, such as, for example, a k-means clustering-type process, though claimed subject matter is not so limited. Other suitable clustering approaches may also be employed. Here, a number of clusters may be equal or, at times, larger than a known state space (e.g., a number of known states, etc.), for example, and may increase for one or more new primitives as a number of known states increases, such as while one or more unknown states are being added. An example of a transform y, given primitives x, may be given, for example, by the following formulation:

$$y = \prod_i^N \sum_j^M \left(a_{ij} x_j^{b_{ij}}\right) \quad (11)$$

where coefficients are denoted via a and b and may be stored as a kernel part of a model or logic, for example.

It should be appreciated that in certain implementations not all primitives may be similar or be the same. For example, some primitives may use different types of transformations (e.g., may not be linear, etc.). It should also be noted that a number of transformations may vary (e.g., may not be the same, etc.), for example, or that a set or subset of features input may or may not be the same. Thus, as discussed herein, primitive diversity may provide advantages while inferring or classifying a new unknown state, as well as for subject or location invariance, such as changes in a location of a mobile device (e.g., in a backpack, pocket, hand, held to an ear, etc.). Of course, details relating to particular approaches, formulations, or components and merely examples, and claimed subject matter is not limited in this regard. Other approaches, formulations, or components that may have, for example, one or more suitable or desired aspects or characteristics may also be used, in whole or in part.

At operation 408, based, at least in part, on one or more discovered primitives, one or more unknown indistinguishable or inconsistently distinguishable motion states may be inferred or classified. For example, in an implementation, a motion state may be inferred or classified using, in whole or in part, one or more approaches discussed above. Here, a motion state may be inferred or classified semi-autonomously, for example, such as via a user's hint representative of an unknown motion state or known action, as was indicated. In some instances, motion state inference or classification may be user-assisted (e.g., via a non-autonomous learning mode, etc.), meaning that a mobile device may use, at least in part, particular user-device interaction to build logical inference of an unknown indistinguishable state. For example, a user may initiate state recognition by pressing a corresponding key or choosing a menu selection to define an ontological term (e.g. "playing basketball," "driving," etc.), "learn a new state," or the like. A suitable application processor associated with a mobile device may then initiate distinguishable state inference, for example, or, optionally or alternatively, primitive discovery, which may be followed by an updated inference, if appropriate or otherwise desired.

Figure 5:
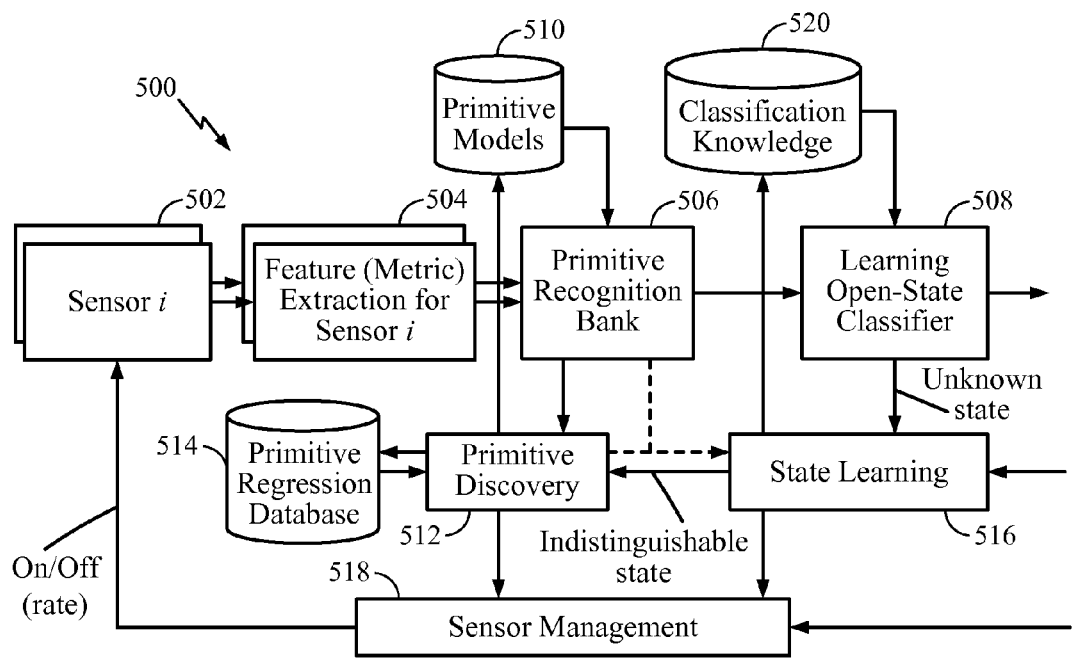
FIG. 5 is a flow diagram illustrating another implementation of an example process for inferring or classifying an unknown indistinguishable motion state.

FIG. 5 is a flow diagram illustrating a summary or architectural concept of another implementation of an example process that may be performed, in whole or in part, to infer or classify an unknown motion state, such as, for example, an unknown indistinguishable (UID) motion state. Again, it should be noted that information acquired or produced, such as, for example, input signals, output signals, operations, results, etc. associated with an example process, referenced via an arrow at 500, may be represented by one or more digital signals. It should also be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

As previously mentioned, one or more measurement signals may be obtained via one or more associated sensors, such as at operation 502, for example, using one or more appropriate techniques, such as one or more techniques discussed above. As was also indicated, based, at least in part, on one or more measurement signals, one or more suitable features (e.g., sensor metrics, etc.) may be extracted or derived, as referenced generally at operation 504. It should be appreciated that even though only a certain number of sensors or associated feature extractions are illustrated in FIG. 5, any number of sensors or feature extractions may be implemented to facilitate or otherwise support one or more operations in connection with example process 500. As illustrated, one or more output signals from feature extraction operation 504 may be used, at least in part, at operation 506 by a primitive recognition bank. A primitive recognition bank may, for example, recognize one or more primitives as well as respective probabilities associated with these primitives and may communicate appropriate information for state inference or classification to a learning open-state classifier, as referenced at operation 508.

A primitive recognition bank may, for example, recognize one or more primitives based, at least in part, on one or more available or suitable features. Availability of features may depend, for example, on an operating or power mode of one or more sensors (e.g., which sensors are turned on, etc.), sensor configurations, or the like. A primitive recognition bank may utilize or reference, in whole or in part, one or more primitive models that may be stored or retained in some manner, such as at operation 510, for example, to facilitate or support primitive recognition. For example, a model of a primitive may specify which features may be used, at least in part, or otherwise available, associated confidences, available sensor(s), how to derive a primitive from one or more features, statistical aspects of a primitive, or the like. One or more primitive models may, for example, be determined via training or so-called bootstrapping or, optionally or alternatively, via primitive discovery, such as at operation 512. As previously mentioned, primitive discovery may generate one or more new primitive models, for example, and may refine or prune one or more existing primitive models to remove one or more redundant, unnecessary, or otherwise less useful primitives. To facilitate or support discovery of one or more new primitives, a primitive regression database may, for example, be maintained in some manner, such as at operation 514. A primitive regression database may be a strategic or otherwise suitable collection of one or more features, such as, for example, one or more previously extracted features. Process 500 may initiate primitive discovery if one or more additional primitives may be needed or otherwise useful to distinguish an indistinguishable state or inconsistently distinguishable state, as was also indicated. A need for or usefulness of one or more additional primitives may be determined via a state learning component at operation 516, for example, or at classification or inference component at operation 508.

A primitive recognition bank may comprise, for example, one or more primitive recognition engines (e.g., a bank of primitives, discriminators, etc.), which may facilitate or support primitive recognition based, at least in part, on an appropriate or otherwise suitable primitive model, given available sensor metrics (e.g., signal measurements, primitive patterns, etc.). A primitive recognition engine may, for example, assign a suitable probabilistic metric associated with a primitive recognition result or, if a relevant input is unavailable, a metric may be labeled as unknown. Here, motion state learning may occur, for example, if a request to discover one or more new (e.g., discriminating, etc.) primitives is received, as discussed above. In some instances, learning approach may include, for example, an experimental determination of one or more additional primitive models, just to illustrate one possible implementation. Thus, a new primitive may or, at times, would discriminate, given a regression database.

Primitive discovery may also include modification or refinement of one or more existing primitives, for example, and, as such, existing primitives may or may not change. If one or more existing primitives may not change, for example, one or more logical inferences in a classification or inference operation 508 may not change. This may provide benefits in terms of scalability, consistency, stability, or the like. For example, one particular benefit may be that primitive discovery may not be needed or useful. Rather, as a number of primitives grows, more unknown motion states may, for example, be inferred or classified via one or more existing (e.g., the same, similar, etc.) primitives. Primitives may also be added (e.g., to classification knowledge, etc.) so that a mobile device may be capable of inferring or classifying one or more motion states in a power-saving mode with fewer active sensors (e.g., turned on, etc.), for example, or with one or more sensors in lower power modes. Primitive discovery may also determine, for example, which sensor metrics may be stored or retained for future regression or discovery of future primitives.

At operation 518, sensor management may be implemented in some manner, such as, for example, via a determination which primitives may be needed or otherwise useful for particular state inference or classification. For example, if an inference of a particular motion state fails or has lower confidence, one or more sensors may be turned on or off, such that a more confident inference may be drawn by a learning open-state classifier at operation 508. As such, one or more sensors useful for logically inferring or classifying a particular motion state or distinguishing between motion states, for example, may be employed, while less useful sensors may be turned off or transitioned into a lower power mode for more effective of efficient power management. As previously mentioned, a learning classifier may comprise, for example, an open-state learning classifier, meaning that it may be capable of classifying unknown as well as known motion states. A classifier may comprise, for example, a suitable logic table-based inference engine, just to illustrate one possible implementation. In some instances, a classifier may employ one or more Bayesian networks or adaptive pattern recognition techniques, for example, to infer or classify a motion state based, at least in part, on one or more primitive patterns.

As previously mentioned, classification knowledge may, for example, be bootstrapped or trained with one or more initial states corresponding to statistical matches of bootstrapped primitives. For example, a logic table may be initialized with one or more observed patterns of primitive determinations so that one or more corresponding states may be inferred with associated probabilities. In addition, a learning open-state classifier may facilitate or support knowledge updates via a number of statistical additions, for example, observed or otherwise acquired in real time or near real time. For example, logical knowledge observed or otherwise acquired from training may be utilized, at least in part, in real time or near real time in connection with probabilistic inference or like reasoning. Logical knowledge may, for example, be updated with an unknown state (e.g., a learned state, etc.) and may be used, at least in part, for motion state classification by determining which primitives have a better or otherwise suitable ability to distinguish between motion states. Thus, a learning open-state classifier may be used, at least in part, to maintain primitive diversity, compress or remove one or more redundant, unnecessary, or otherwise less useful primitives, update machine learning via user-device interaction (e.g. a hint, feedbacks, etc.), or the like.

In an implementation, a learning open-state classifier may, for example, recognize one or more unknown motion states based, at least in part, on respective probabilities associated with one or more primitives or classification knowledge. For example, one or more unknown distinguishable states may be recognized by one or more recurring patterns in one or more primitives. Thus, motion state learning may add classification knowledge, as referenced generally at 520, for example, by adding an entry to a logic table with a new primitive pattern and a unique state identifier with associated statistics. These statistics and patterns may be refined as more observations become available. However, if a distinct primitive pattern may not be distinguished or recognized, for example, then one or more new primitives may be needed or otherwise useful, and a state learning component may request primitive discovery, such as at operation 516. For example, if there is an entry in classification knowledge indicating that more than one confusable state (e.g., known or unknown), or if there is no consistent pattern corresponding to a semi-autonomous or user-assisted learning mode, then one or more new primitives may be requested. New primitive discovery may, for example, continue until a sufficiently distinct pattern is found, as previously mentioned. In some instances, such a pattern may comprise, for example, a pattern that may help to distinguish a new unknown motion state from one or more other known or unknown motion states. Classification knowledge may be updated with a new determined pattern, for example, and one or more new primitives may be stored or otherwise retained.

Continuing with above discussion, if an unknown state is continually, consistently, or otherwise sufficiently distinguishable via one or more existing primitives, for example, classification knowledge may be updated so that an unknown state may become a known or inferable state using that knowledge. In some instances, classification knowledge may take the form of one or more logical statements, such as, for example, "State Y may be inferred when primitive I and M are confident or primitive N is confident followed by primitives J and K at the same time." Classification knowledge may also include statements in relation to one or more states, such as, for example, "State Y is mutually exclusive to State Z or cannot occur within some time t of State X." Claimed subject matter is not limited to these particular logical statements, of course. As previously mentioned, a learning open-state classifier may infer or classify a state, for example, even though such a state may not have an ontological name. For example, in some instances, a state may be assigned a unique identifier regardless of whether it has an ontological name. In addition to refining inferences or logical statements about known states in classification knowledge, a classifier may also provide information about unknown states, such as in the form of primitive information or a request for learning, for example, to a state learning component at operation 516. Here, motion state learning may include, for example, obtaining hints or like user inputs upon which unknown motion state learning may be initiated. As described above, motion state learning may be based, at least in part, on semi-autonomous or user-assisted modes or approaches, for example.

In some instances, a learning open-state classifier may make a probabilistic inference, such as at operation 508, for example, based, at least in part, on one or more primitives and may consider a temporal dimension. For example, a learning classifier may make an inference by considering a primitive A and B together or, optionally or alternatively, may consider a primitive A followed by a primitive B. In some instances, a classifier may also consider a power mode of one or more sensors (e.g., turned on or off), directly or indirectly, based, at least in part, on sensor availability (e.g., unknown versus negative, etc.). At times, a classifier may refine one or more logical probabilistic inferences based, at least in part, on one or more statistical observations, such as, for example, whether certain primitives typically agree or disagree, as well as more complex interrelations. Thus, motion state learning may, for example, determine whether an unknown motion state may be distinguished via one or more given or existing primitives. For example, a suitable processor associated with a mobile device may obtain measurement signals from various sensors to determine whether these sensors yield a viable or suitable inference, given existing primitives. If not, for example, example process 500 may initiate new primitive discovery, as previously mentioned. Motion state learning may also request primitive discovery if a particular inference has a lesser confidence or insufficient primitive diversity (e.g., relies mostly on a smaller number of primitives, etc.). Motion state learning may also assist primitive discovery in building or maintaining a regression database, such as at operation 514, for example, by identifying which one or more primitives may be important or otherwise useful for motion state inference or classification.

Figure 6:
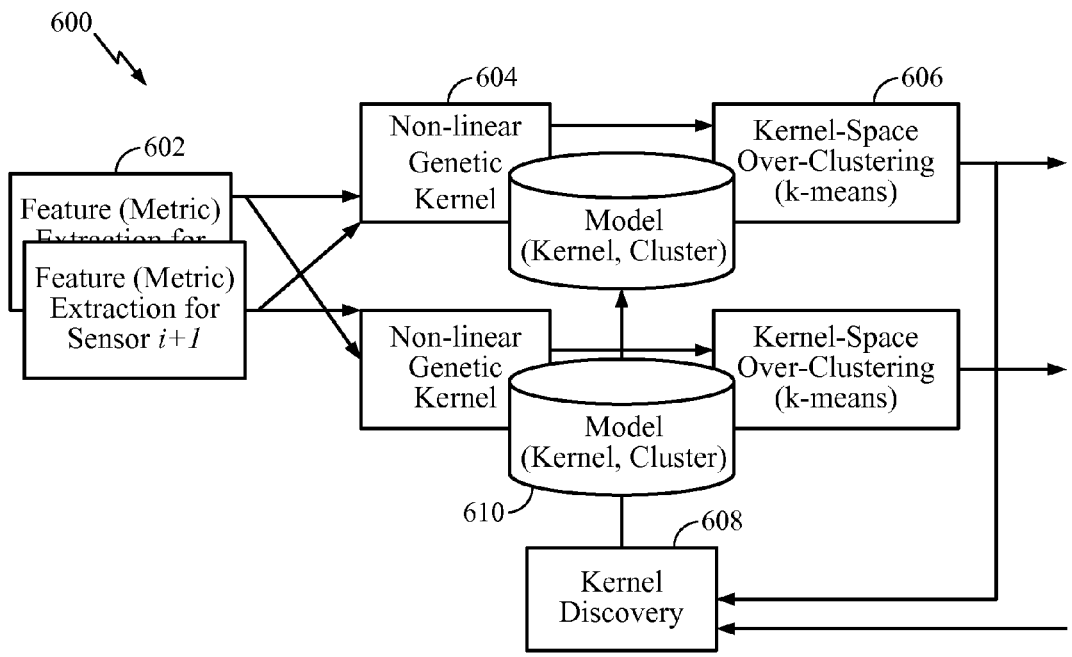
FIG. 6 is a flow diagram illustrating certain functional aspects of the process of FIG. 5.

FIG. 6 is a flow diagram illustrating certain functional aspects 600 of the process of FIG. 5, for example, where a primitive is modeled by a kernel and cluster statistics in connection with a genetic algorithm-type approach according to an implementation. As illustrated, one or more feature extractions, indicated generally by an arrow at 602, may be performed with respect to one or more measurement signals provided via one or more associated sensors, as previously mentioned. Each feature extraction may, for example, correspond to a separate sensor, such as a gyroscope or an accelerometer, respectively. Optionally or alternatively, each extraction may combine features from more than one sensor, such as an accelerometer and a gyroscope, for example, or a temperature and a light sensor, or the like. Again, any suitable number or combination of sensors or feature extractions may be used. As described below, in certain simulations or experiments, means, peak co-variances, and peak auto-correlations were extracted. In some instances, a priori knowledge or generalized features with respect to certain sensor characteristics may be used, in whole or in part, though claimed subject matter is not so limited.

In an implementation, one or more extracted features may be used, at least in part, by one or more non-linear genetic kernels, illustrated generally by an arrow at 604, which may comprise one or more associated models. A particular example of an approach employing a non-linear kernel is illustrated above, such as, for example, in connection with operation 406 of FIG. 4. Signal values representative of one or more non-linear genetic kernels may, for example, be provided as input to a kernel space over-clustering (e.g., k-means, etc.), as indicated by an arrow at 606, to facilitate or support motion state inference or classification. As described above, at operation 608, kernel discovery may be initiated, and one or more models (e.g., kernels, clusters, etc.) may be stored or otherwise retained in some manner, as indicated generally at 610.

For this example, primitive output signals may comprise, for example, a closest or otherwise suitable cluster, distance from such a cluster or distances to all suitable clusters, or probability associated with such a cluster or with each suitable cluster. Claimed subject matter is not limited to these particular output signals, of course. Probability may, for example, be derived from a cluster model for a primitive. A cluster model may comprise statistics about information or data points falling nearest or sufficiently near to each cluster centroid, for example. In some instances, a cluster may be modeled by a Gaussian distribution in a transformed dimension space with a given variance (e.g., mean is zero by assuming distance from a cluster centroid, etc.). Probability or confidence of a primitive for a given cluster may, for example, be determined by computing cumulative statistical probability of a sample being closer to a centroid than a kernel result. Again, this is merely an example to which claimed subject matter is not limited, and various other approaches may also be used. It should be noted that clusters may or may not correspond one-to-one to states, as previously mentioned. For example, one or more clusters may be representative of primitive output signals rather than states. Primitive identification or recognition may be performed via one or more appropriate techniques, such as, for example, a technique discussed above.

At times, clusters may be related to states, such as, for example, many-to-one. In such a case, a suitable approach to state inference or classification may include, for example, voting on a state based, at least in part, on primitives or weighted vote by each primitive's confidence, just to illustrate one possible implementation. In some instances, primitive outputs may be relatively diverse and may include, for example, multiple values (e.g., distances, etc.), confidences (e.g., probabilities, etc.), or the like. As such, state classification may result in a less than sufficiently consistent vote even if their value space is mapped to states. Accordingly, here, for motion state inference or classification, one or more suitable characteristics, such as, for example, primitive outputs (e.g., values, confidences, etc.) may be used. One or more suitable primitive output signals, such as signals with confidences, for example, may be subsequently communicated as inputs to a probabilistic open-state classifier, such as at operation 508 of FIG. 5, as previously mentioned.

Accordingly, as discussed herein, machine learning of known or unknown motion states with sensor fusion may provide benefits. For example, motion state inference or primitive determination may be advantageously separated, such that new inferences may be reasoned or new primitives may be discovered. Primitive diversity may, for example, allow known as well as unknown motion states to be sufficiently distinguished. It may not be necessary or otherwise useful to update or retrain one or more existing primitives or existing logic upon addition of one or more new primitives, for example. Thus, one or more new states may be advantageously added without adding primitives. Primitive design may also allow one or more sensors to be sufficiently managed to optimize certain constraints, such as power limitations in battery-powered mobile devices, for example, while allowing for state inference or classification or new state detection.

In addition, primitive learning may have a random component to primitive derivation, for example, or may be over-classifying, which may advantageously result in a larger number of potential combinations than known motion states. At times, it may be desirable not to over-train individual primitives, however, as they may be less likely to distinguish new unknown motion states. It should also be appreciated that the more primitives may disagree, for example, the easier they may detect new states. In other words, it may not be necessary or useful for primitive discovery to result in all or most primitives consistently giving the same or similar result for a given state, for example. These conditions may be detected or managed, for example, via primitive diversity by reducing redundancy, discovering more primitives for more diversity, or the like. Furthermore, for a diverse set of primitives, for example, more primitive combinations may be possible, or a fewer number of primitives may be added as more states become known. Also, existing primitives may not change while more primitives are added, which may also provide benefits, as mentioned above. In addition, suitable subsets of primitives may be used, at least in part, depending on a number of active sensors, as was also indicated. If confidence is somewhat insufficient, for example, more or different sensors (e.g., primitives, etc.) may be turned on or employed.

Also, a learning open-state classifier may, for example, be capable of identifying or classifying unknown motion states using sufficiently diverse primitives. Thus, an unknown motion state may be sufficiently distinguished, and a new state may be effectively or efficiently established in a logical framework using existing primitives. If an unknown state may not be distinguished using existing primitives, for example, a process may advantageously initiate new primitive discovery so that a new state may then be established in a logical framework.

As previously mentioned, primitive diversity may be advantageous. Primitive diversity may be measured and used as input for one or more operations or components to determine, for example, if discovering more primitives may be useful. In some instances, primitive diversity may, for example, be measured via a correlation between coefficients in kernel transforms. If transforms in different kernels (e.g., primitives, etc.) are sufficiently different in relying on different combinations of features to different degrees, for example, primitive diversity may be relatively high or otherwise sufficient. Primitive diversity may also be measured by a likelihood that primitives may disagree, for example, if voted on a state. It should be noted that because primitives disagree may not mean that state may not be reliably or otherwise sufficiently inferred or classified. In some instances, a state may be inferred or classified if primitives disagree, for example, since characteristics of a motion state may be quite diverse. This may be advantageous because it distinguishes ability to detect new unknown states from ability to recognize known states. In other words, ability to recognize unknown states may not necessarily negatively impact or affect ability to recognize known motion states. Of course, such a description of certain aspects of machine learning of known or unknown motion states with sensor fusion and its benefits is merely an example, and claimed subject matter is not so limited.

Figure 7A:
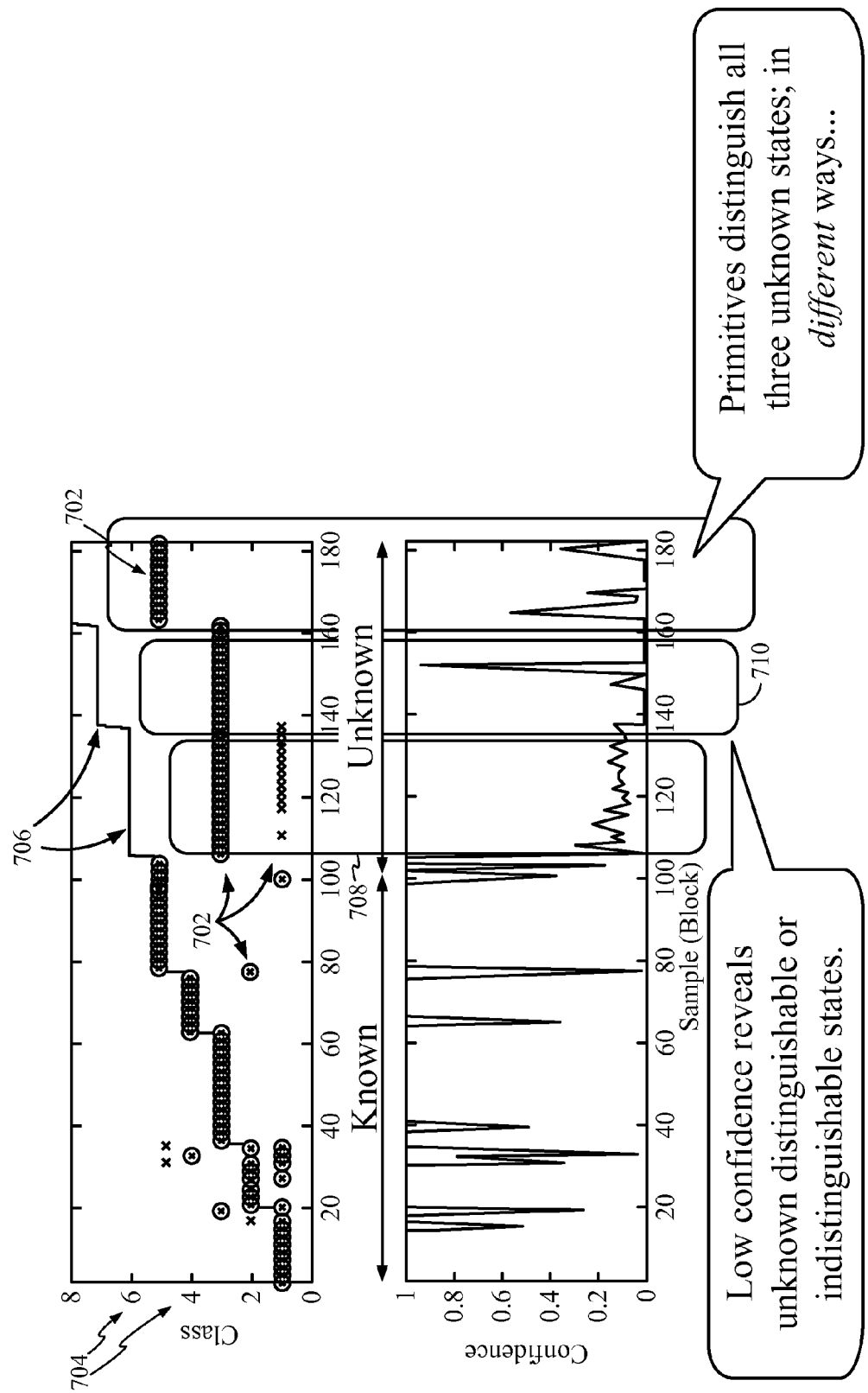
FIGS. 7A and 7B are plots illustrating results of learning open-state classification according to an implementation.
Figure 7B:
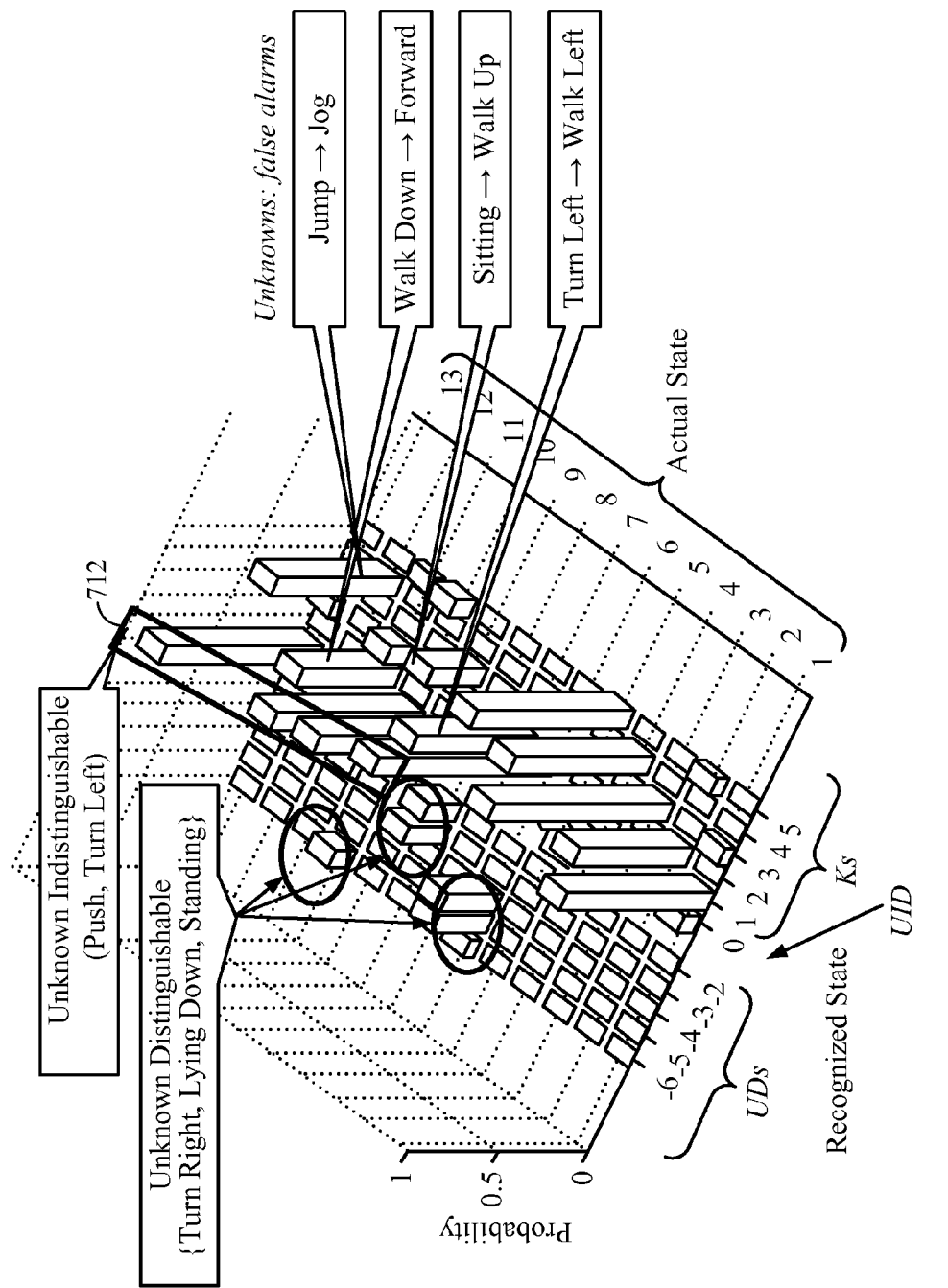

By way of example but not limitation, some results of inferring or classifying one or more unknown motion states in connection with certain simulations or experiments are illustrated in FIGS. 7A and 7B. It should be appreciated that various motion states, confidence levels, primitives, or the like are shown as merely examples to which claimed subject matter is not limited. In FIG. 7A, an upper plot illustrates primitives, referenced generally at 702, that may suggest or vote for one or more particular motion states or classes of motion (e.g., 1 through 8, etc.), referenced generally at 704, relative to one or more actual motion states 706 (e.g., a baseline, point of reference, etc.), and a lower plot illustrates respective confidence levels. Here, it appeared that primitives in conjunction with corresponding confidence levels, for example, may allow for a reliable or otherwise sufficient unknown motion state inference or classification. For example, it may be observed that less confidence may reveal or indicate an unknown motion state, such as an unknown distinguishable (UD) or unknown indistinguishable (UID) motion state. Further, a particular new (e.g., previously unseen on the plot, etc.) combination of primitives, such as, for example, a combination corresponding to primitive votes or suggestions for classes of motion one and three, referenced via an outline 708 (e.g., between approx. sample 105 and 135, etc.), may be indicative of a primitive disagreement with respect to two different motion states. As previously mentioned, such a disagreement may, in turn, be indicative of a new unknown motion state that may be sufficiently distinguished via these existing primitives (e.g., an unknown distinguishable state). As may also be seen, a combination of primitives referenced via an outline 710 (e.g., between approx. sample 135 and 180, etc.) are rather indistinguishable from a third motion state, for example, but have a relatively low corresponding confidence, which may be indicative of an unknown indistinguishable motion state. As previously mentioned, confidence may be derived or obtained based, at least in part, on k-means clustering-type process using Euclidian distance normalized for variance or size of a cluster, as one possible example, though claimed subject matter is not so limited.

As further illustrated in FIG. 7B, it appeared that learning open-state classification, as described above, may prove beneficial in distinguishing between unknown distinguishable (UD) and unknown indistinguishable (UID) motion states. For this example, negative numbers reference unknown distinguishable (UD) motions states (e.g., new learned states, etc.), numbers one through five, etc. reference known (K) motion states, and zero references unknown indistinguishable (UID) motion states, for example, relative to actual motion states. It should be noted that probability shown comprises a performance-based probability characterizing or defining confidence in performance, for example, and should be distinguished from individual iteration-based statistical probability or confidence of a particular motion state inference or classification described above. As seen here, a number of unknown indistinguishable motion states triggering primitive generation or regeneration, for example, may be reliably or otherwise sufficiently inferred with a relatively low number of missed detections for UID motion states for confidence. By way of example but not limitation, in one particular simulation or experiment, four unknown indistinguishable motion states (e.g., push, turn left, etc.), referenced generally via a rectangle at 712, were sufficiently identified or inferred, as illustrated. Again, details relating to motion states, detection, or the like are merely examples, and claimed subject matter is not limited in this regard.

Figure 8:
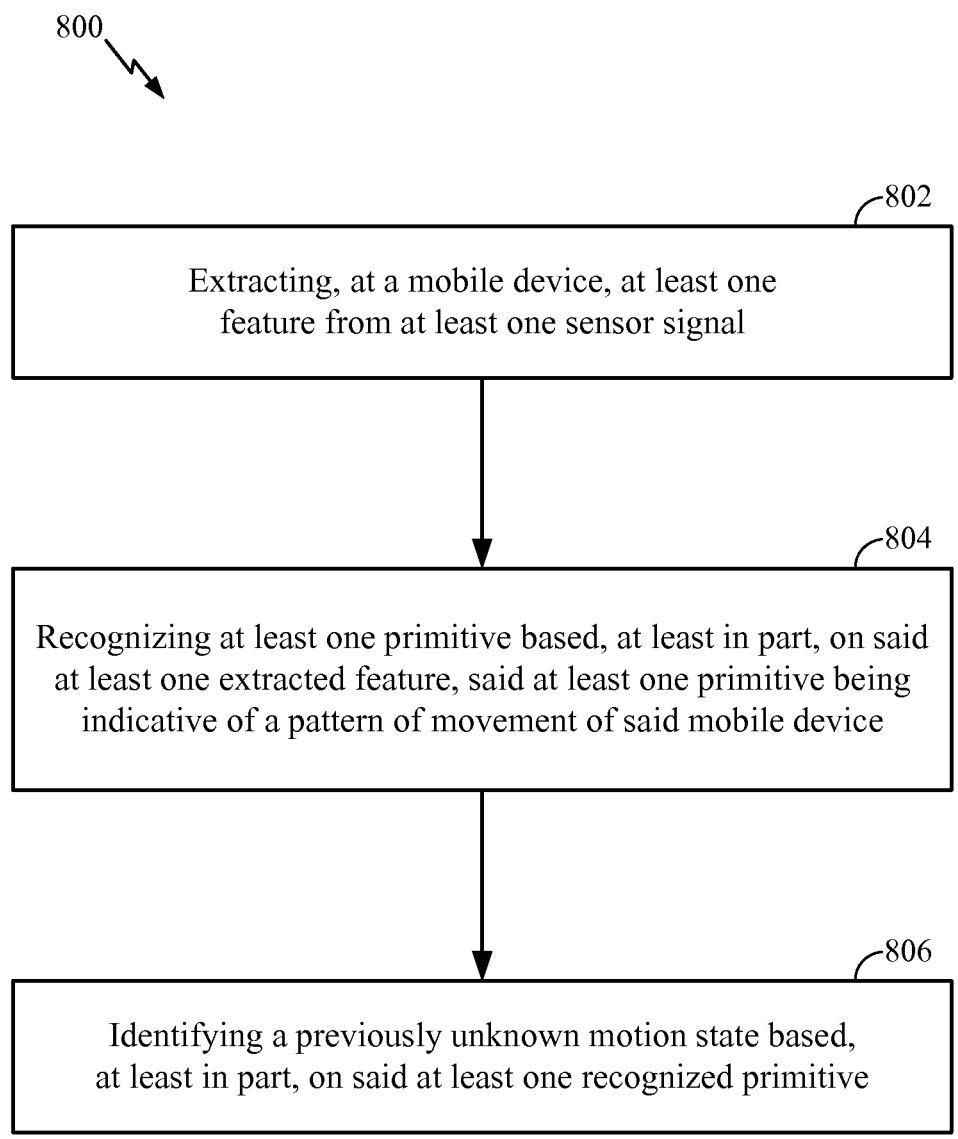
FIG. 8 is a flow diagram illustrating an implementation of an example process for machine learning of known or unknown motion states with sensor fusion.

FIG. 8 is a flow diagram illustrating an implementation of an example process 800 that may be performed, in whole or in part, for machine learning of known or unknown motion states with sensor fusion. Again, it should be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 800 may begin at operation 802, for example, with extracting, at a mobile device, at least one feature from at least one sensor signals. For example, one or more suitable features may be extracted or otherwise derived from measurement signals provided by one or more accelerometers, gyroscopes, gravitometers, tilt sensors, magnetometers, etc. or any combination thereof. Extracted features may comprise, for example, means, co-variances, auto-correlations, energy, or the like, as previously mentioned.

With regard to operation 804, at least one primitive may be recognized based, at least in part, on at least one extracted feature, wherein such at least one primitive being indicative of a pattern of movement of a mobile device. For example, one or more primitives may be recognized via one or more suitable operations in abstract spaces, such as, for example, a transformation operation to potentially increase dimensionality, a classification or mapping operation, etc., or any combination thereof. A primitives indicative of a pattern of movement of a mobile device may comprise, for example, a physical realization of an ontological state, a sub-state of an ontological state, a characteristic of an ontological state, etc., or any combination thereof.

At operation 806, a previously unknown motion state may be identified based, at least in part, on at least one recognized primitive. For example, an unknown distinguishable motion state may be identified, such as inferred or classified, based, at least in part, on one or more existing primitives. Here, unknown state learning may occur autonomously, such as without a hint or like user-initiated input or semi-autonomously, such as via a user's hint. Thus, unknown distinguishable inference learning may, for example, assemble a logical inference based, at least in part, on one or more primitives corresponding to these hints.

In turn, an unknown indistinguishable motion state may be identified, such as inferred or classified, for example, based, at least in part, on new primitive discovery. For example, discovery of one or more new primitives may be initiated if there is less confidence or consistency observed with respect to a motion state. Thus, primitive discovery may, for example, find one or more characteristics that may be helpful or useful in distinguishing an unknown indistinguishable motion state and may build a suitable inference or classification for such a state. New primitive discovery may continue until, for example, a sufficiently distinct primitive pattern is found. Classification knowledge may be updated with a new discovered primitive pattern, for example, and one or more new primitives may be stored or otherwise retained in some manner.

Figure 9:
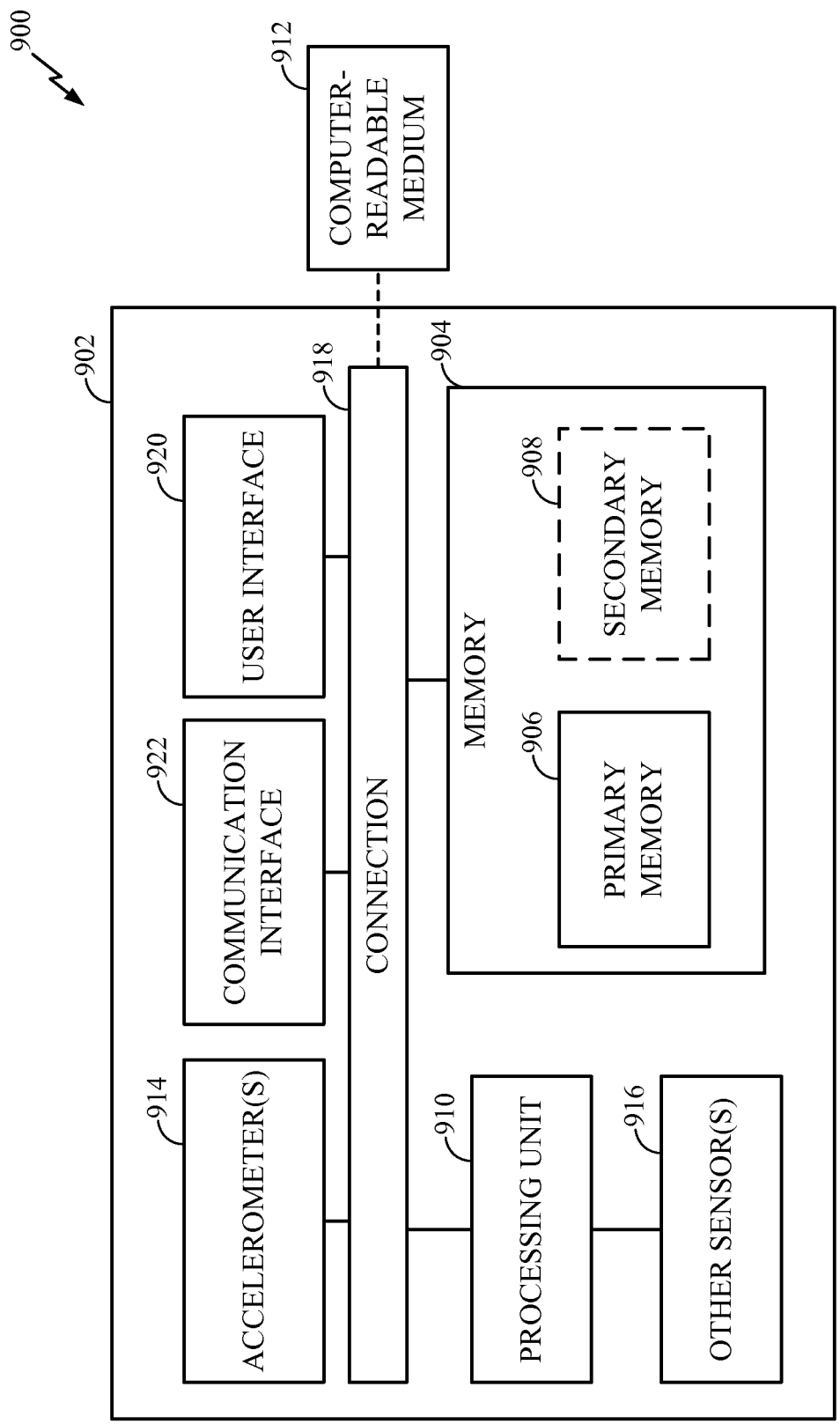
FIG. 9 is a schematic diagram illustrating an example computing environment associated with a mobile device according to an implementation.

FIG. 9 is a schematic diagram illustrating an implementation of an example computing environment 900 that may include one or more networks or devices capable of partially or substantially implementing or supporting one or more processes or operations for machine learning of known or unknown motion states with sensor fusion. It should be appreciated that all or part of various devices or networks shown in computing environment 900, processes, or methods, as described herein, may be implemented using various hardware, firmware, software, or any combination thereof.

Computing environment 900 may include, for example, a mobile device 902, which may be communicatively coupled to any number of other devices, mobile or otherwise, via a suitable communications network, such as a cellular telephone network, the Internet, mobile ad-hoc network, wireless sensor network, or the like. In an implementation, mobile device 902 may be representative of any electronic device, appliance, or machine that may be capable of exchanging information over any suitable communications network. For example, mobile device 902 may include one or more computing devices or platforms associated with, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. In certain example implementations, mobile device 902 may take the form of one or more integrated circuits, circuit boards, or the like that may be operatively enabled for use in another device. Although not shown, optionally or alternatively, there may be additional devices, mobile or otherwise, communicatively coupled to mobile device 902 to facilitate or otherwise support one or more processes associated with computing environment 900.

Thus, unless stated otherwise, to simplify discussion, various functionalities, elements, components, etc. are described below with reference to mobile device 902 may also be applicable to other devices not shown so as to support one or more processes associated with example computing environment 900.

Although not shown, in certain implementations, computing environment 900 may include, for example, various computing or communication resources capable of providing position or location information with regard to a mobile device 902 based, at least in part, on one or more wireless signals associated with a positioning system, location-based service, or the like. For example, mobile device 902 may include a location-aware or tracking unit capable of acquiring or providing all or part of orientation, position information (e.g., via trilateration, heat map signature matching, etc.), etc. Such information may be provided in support of one or more processes in response to user instructions, motion-controlled or otherwise, which may be stored in memory 904, for example, along with other suitable or desired information, such as one or more features, threshold values, parameters, constants, or the like.

Memory 904 may represent any suitable or desired information storage medium. For example, memory 904 may include a primary memory 906 and a secondary memory 908. Primary memory 906 may include, for example, a random access memory, read only memory, etc. While illustrated in this example as being separate from a processing unit 910, it should be appreciated that all or part of primary memory 906 may be provided within or otherwise co-located/coupled with processing unit 910. Secondary memory 908 may include, for example, the same or similar type of memory as primary memory or one or more information storage devices or systems, such as, for example, a disk drive, an optical disc drive, a tape drive, a solid state memory drive, etc. In certain implementations, secondary memory 908 may be operatively receptive of, or otherwise enabled to be coupled to, a computer-readable medium 912.

It should be understood that a storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, to illustrate one possible implementation. As such, "non-transitory" may refer, for example, to any medium or device remaining tangible despite this change in state.

Computer-readable medium 912 may include, for example, any medium capable of storing or providing access to information, code or instructions (e.g., an article of manufacture, etc.) for one or more devices associated with computing environment 900. For example, computer-readable medium 912 may be provided or accessed by processing unit 910. As such, in certain example implementations, methods or apparatuses may take the form, in whole or part, of a computer-readable medium that may include computer-implementable instructions stored thereon, which, if executed by at least one processing unit or other like circuitry, may enable processing unit 910 or the other like circuitry to perform all or portions of a location determination processes, proximity sensor-based or sensor-supported measurements, or any like processes helpful in removing or otherwise mitigating distance detection ambiguity. In certain example implementations, processing unit 910 may be capable of performing or supporting other functions, such as communications, gaming, or the like.

Processing unit 910 may be implemented in hardware or a combination of hardware and software. Processing unit 910 may be representative of one or more circuits capable of performing at least a portion of information computing technique or process. By way of example but not limitation, processing unit 910 may include one or more processors, controllers, microprocessors, microcontrollers, application specific integrated circuits, digital signal processors, programmable logic devices, field programmable gate arrays, or the like, or any combination thereof.

Mobile device 902 may include various components or circuitry, such as, for example, one or more accelerometers 914, or various other sensor(s) 916, such as a proximity sensor, a magnetic compass, a gyroscope, a video sensor, a gravitometer, temperature sensor, an ambient environment sensor, etc. that may facilitate or otherwise support one or more processes associated with computing environment 900. For example, such sensors may provide analog or digital signals to processing unit 910. Although not shown, it should be noted that mobile device 902 may include an analog-to-digital converter (ADC) for digitizing analog signals from one or more sensors. Optionally or alternatively, such sensors may include a designated (e.g., an internal, etc.) ADC(s) to digitize respective signals, although claimed subject matter is not so limited.

Although not shown, mobile device 902 may also include a memory or information buffer to collect suitable or desired information, such as, for example, sensor measurement information. Mobile device 902 may also include a power source, for example, to provide power to some or all of the components or circuitry of mobile device 902. A power source may be a portable power source, such as a battery, for example, or may comprise a fixed power source, such as an outlet (e.g. in a house, electric charging station, car, etc.). It should be appreciated that a power source may be integrated into (e.g., built-in, etc.) or otherwise supported by (e.g., stand-alone, etc.) mobile device 902.

Mobile device 902 may include one or more connections 918 (e.g., buses, lines, conductors, optic fibers, etc.) to operatively couple various circuits together, and a user interface 920 (e.g., display, touch screen, keypad, buttons, knobs, microphone, speaker, trackball, data port, etc.) to receive user input, facilitate or support sensor-related signal measurements, or provide information to a user. Mobile device 902 may further include a communication interface 922 (e.g., wireless transmitter or receiver, modem, antenna, etc.) to allow for communication with one or more other devices or systems over one or more suitable communications networks, as was indicated.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk, and blue-ray disc where disks usually reproduce data magnetically, while discs reproduce data optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In one particular implementation, a mobile device may, for example, be capable of communicating with one or more femtocells facilitating or supporting communications with the mobile device for the purpose of estimating its location, orientation, velocity, or the like. As used herein, "femtocell" may refer to one or more smaller-size cellular base stations that may be enabled to connect to a service provider's network, for example, via broadband, such as, for example, a Digital Subscriber Line (DSL) or cable. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
   extracting, at a mobile device, at least one feature from at least one sensor signal;
   recognizing at least one primitive based, at least in part, on said at least one extracted feature, said at least one primitive being indicative of a pattern of movement of said mobile device; and
   identifying a new motion state based, at least in part, on said at least one recognized primitive.

2. The method of claim 1, wherein said new motion state is distinguishable from a previously known motion state based, at least in part, on a measure of confidence or consistency.

3. The method of claim 2, wherein said measure of confidence or consistency comprises a cumulative statistical probability of a sample distribution within a cluster.

4. The method of claim 2, wherein said measure of confidence or consistency comprises an individual iteration-based statistical probability.

5. The method of claim 1, and further comprising initiating discovery of at least one additional primitive in response to said new motion state not being distinguishable from at least one of the following: a previously known motion state, said new motion state, a new distinguishable motion state, or any combination thereof.

6. The method of claim 5, wherein said discovery of said at least one additional primitive is initiated based, at least in part, on a measure of confidence or consistency.

7. The method of claim 5, wherein said discovery of said at least one additional primitive is performed in connection with an application of a genetic algorithm-type process.

8. The method of claim 5, and further comprising storing at least one digital signal representing said new motion state as a known motion state defined, at least in part, by said at least one additional primitive.

9. The method of claim 1, and further comprising identifying a previously known motion state based, at least in part, on said at least one recognized primitive.

10. The method of claim 1, wherein said recognizing said at least one primitive is based, at least in part, on a probabilistic logical determination.

11. The method of claim 1, wherein said at least one feature comprises at least one pre-defined feature.

12. The method of claim 1, wherein said identifying said new motion state comprises identifying said state while said mobile device is in a power-saving mode.

13. The method of claim 12, wherein said power-saving mode comprises an operating mode sufficient to identify said new motion state based, at least in part, on a minimum number of primitives.

14. The method of claim 13, wherein while operating in said power-saving mode said mobile device uses, at least in part, sensor configuration with variable sensor activation parameters.

15. The method of claim 1, wherein said new motion state comprises at least one of the following: an unknown distinguishable motion state, an unknown indistinguishable motion state, or any combination thereof.

16. The method of claim 15, wherein said unknown indistinguishable motion state is identified based, at least in part, on a primitive discovery.

17. The method of claim 15, wherein said unknown distinguishable motion state is identified based, at least in part, on at least one new logical inference.

18. The method of claim 1, wherein said new motion state is identified in response to a user interaction with said mobile device.

19. The method of claim 1, wherein said at least one sensor signal comprises at least one of the following: an inertial sensor signal, an ambient environment sensor signal, or any combination thereof.

20. The method of claim 1, wherein said at least one sensor signal is generated, at least in part, by at least one of the following disposed in said mobile device: an accelerometer, a gyroscope, a magnetometer, a temperature sensor, an ambient light detector, a proximity sensor, a barometric pressure sensor, or any combination thereof.

21. An apparatus comprising:
a mobile device comprising at least one processor configured to:
extract at least one feature from at least one sensor signal;
recognize at least one primitive based, at least in part, on said at least one extracted feature, said at least one primitive being indicative of a pattern of movement of said mobile device; and
identify a new motion state based, at least in part, on said at least one recognized primitive.

22. The apparatus of claim 21, wherein said new motion state is distinguishable from a previously known motion state based, at least in part, on a measure of confidence or consistency.

23. The apparatus of claim 22, wherein said measure of confidence or consistency comprises a cumulative statistical probability of a sample distribution within a cluster.

24. The apparatus of claim 21, wherein said at least one processor is further configured to:
initiate discovery of at least one additional primitive in response to said new motion state not being distinguishable from at least one of the following: a previously known motion state, said new motion state, a new distinguishable motion state, or any combination thereof.

25. The apparatus of claim 24, wherein said discovery of said at least one additional primitive is performed in connection with an application of a genetic algorithm-type process.

26. The apparatus of claim 24, wherein said at least one processor is further configured to:
store at least one digital signal representing said new motion state as a known motion state defined, at least in part, by said at least one additional primitive.

27. The apparatus of claim 21, wherein said at least one processor is further configured to:
recognize said new motion state responsive to a user interaction with said mobile device.

28. The apparatus of claim 21, wherein said at least one processor is further configured to:
identify a previously known motion state based, at least in part, on said at least one recognized primitive.

29. The apparatus of claim 21, wherein said at least one processor is configured to recognize said at least one primitive based, at least in part, on a probabilistic logical determination.

30. The apparatus of claim 21, wherein said at least one processor is configured to identify said new motion state by identifying said state while said mobile device is in a power-saving mode sufficient to identify said new motion state based, at least in part, on a minimum number of primitives.

31. The apparatus of claim 21, wherein said new motion state comprises at least one of the following: an unknown distinguishable motion state, an unknown indistinguishable motion state, or any combination thereof.

32. The apparatus of claim 31, wherein said at least one processor is configured to identify said unknown indistinguishable motion state based, at least in part, on a primitive discovery.

33. The apparatus of claim 31, wherein said at least one processor is configured to identify said unknown distinguishable motion state based, at least in part, on at least one new logical inference.

34. The apparatus of claim 21, wherein said at least one processor is configured to identify said new motion state in response to a user interaction with said mobile device.

35. The apparatus of claim 21, wherein said at least one sensor signal comprises at least one of the following: an inertial sensor signal, an ambient environment sensor signal, or any combination thereof.

36. An apparatus comprising:
means for extracting, at a mobile device, at least one feature from at least one sensor signal;
means for recognizing at least one primitive based, at least in part, on said at least one extracted feature, said at least one primitive being indicative of a pattern of movement of said mobile device; and means for identifying a new motion state based, at least in part, on said at least one recognized primitive.

37. The apparatus of claim 36, said new motion state is distinguishable from a previously known motion state based, at least in part, on a measure of confidence or consistency.

38. The apparatus of claim 37, wherein said measure of confidence or consistency comprises a cumulative statistical probability of a sample distribution within a cluster.

39. The apparatus of claim 36, and further comprising means for initiating discovery of at least one additional primitive in response to said new motion state not being distinguishable from at least one of the following: a previously known motion state, said new motion state, a new distinguishable motion state, or any combination thereof.

40. The apparatus of claim 39, wherein initiating discovery of said at least one additional primitive is initiated based, at least in part, on a measure of confidence or consistency.

41. The apparatus of claim 39, wherein said discovery of said at least one additional primitive is performed in connection with an application of a genetic algorithm-type process.

42. The apparatus of claim 39, and further comprising means for storing at least one digital signal representing said new motion state as a known motion state defined, at least in part, by said at least one additional primitive.

43. The apparatus of claim 36, and further comprising means for identifying a previously known motion state based, at least in part, on said at least one recognized primitive.

44. The apparatus of claim 36, wherein said means recognize said at least one primitive based, at least in part, on a probabilistic logical determination.

45. The apparatus of claim 36, wherein said means identify said new motion state while said mobile device is in a power-saving mode.

46. The apparatus of claim 45, wherein said power-saving mode comprises an operating mode sufficient to identify said new motion state based, at least in part, on a minimum number of primitives.

47. The apparatus of claim 46, wherein, while operating in said power-saving mode, said mobile device uses, at least in part, sensor configuration with variable sensor activation parameters.

48. The apparatus of claim 36, wherein said new motion state comprises at least one of the following: an unknown distinguishable motion state, an unknown indistinguishable motion state, or any combination thereof.

49. The apparatus of claim 48, wherein said unknown indistinguishable motion state is identified based, at least in part, on a primitive discovery.

50. The apparatus of claim 48, wherein said unknown distinguishable motion state is identified based, at least in part, on at least one new logical inference.

51. The apparatus of claim 36, wherein said new motion state is identified in response to a user interaction with said mobile device.

52. The apparatus of claim 36, wherein said at least one sensor signal comprises at least one of the following: an inertial sensor signal; an ambient environment sensor signal; or any combination thereof.

53. An article comprising:
a non-transitory storage medium having instructions stored thereon executable by a special purpose computing platform at a mobile device to:
extract at least one feature from at least one sensor signal;
recognize at least one primitive based, at least in part, on said at least one extracted feature, said at least one primitive being indicative of a pattern of movement of said mobile device; and
identify a new motion state based, at least in part, on said at least one recognized primitive.

54. The article of claim 53, wherein said new motion state is distinguishable from a previously known motion state based, at least in part, on a measure of confidence or consistency.

55. The article of claim 54, wherein said measure of confidence or consistency comprises a cumulative statistical probability of a sample distribution within a cluster.

56. The article of claim 53, wherein said storage medium further includes instructions to:
initiate discovery of at least one additional primitive in response to said new motion state not being distinguishable from at least one of the following: a previously known motion state, said new motion state, a new distinguishable motion state, or any combination thereof.

57. The article of claim 53, wherein said storage medium further includes instructions to:
identify a previously known motion state based, at least in part, on said at least one recognized primitive.

58. The article of claim 53, wherein said instructions to said recognize said at least one primitive is based, at least in part, on a probabilistic logical determination.

59. The article of claim 53, wherein said instructions to identify said new motion state comprise instructions to identify said state while said mobile device is in a power-saving mode sufficient to said identify said new motion state based, at least in part, on a minimum number of primitives.

60. The article of claim 53, wherein said new motion state comprises at least one of the following: an unknown distinguishable motion state identified based, at least in part, on a primitive discovery; an unknown indistinguishable motion state identified based, at least in part, on at least one new logical inference; or any combination thereof.

* * * * *